(12) United States Patent
Klein et al.

(10) Patent No.: US 8,261,132 B2
(45) Date of Patent: Sep. 4, 2012

(54) METHOD FOR ERROR TREE ANALYSIS

(75) Inventors: Wolfram Klein, Neubiberg (DE);
Ariane Sutor, Gräfelfing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/226,777

(22) PCT Filed: Jan. 17, 2007

(86) PCT No.: PCT/EP2007/050436
§ 371 (c)(1),
(2), (4) Date: Aug. 10, 2009

(87) PCT Pub. No.: WO2007/124961
PCT Pub. Date: Nov. 8, 2007

(65) Prior Publication Data
US 2009/0300418 A1    Dec. 3, 2009

(30) Foreign Application Priority Data

Apr. 28, 2006  (DE) .......................... 10 2006 019 896

(51) Int. Cl.
*G06F 11/00* (2006.01)
(52) U.S. Cl. ....................................... 714/47.1
(58) Field of Classification Search ...................... 714/47
See application file for complete search history.

(56) References Cited

U.S. PATENT DOCUMENTS
2003/0004679 A1    1/2003   Tryon, III et al.

FOREIGN PATENT DOCUMENTS
DE    40 08 560    9/1990
DE    1 035 454    9/2000

OTHER PUBLICATIONS

Somani, Arun "Phase-Mission System Analysis Using Boolean Alebriac Methods" Sigmetrics '94 1994 ACM.*
F.I. Khan et al. "Risk-Based Maintenance (RBM): A Quantitative Approach for Maintenance/Inspection Scheduling and Planning", Journal of Loss Prevention in the Process Industries, vol. 16, Oct. 20, 2003; pp. 561-573.
L. Krishnasamy et al. "Development of a Risk-Based Maintenance (RBM) Strategy for a Power-Generating Plant", Journal of Loss Prevention in the Process Industries vol. 18, Feb. 11, 2005; pp. 69-81.
I. Vrbanić et al. "Use of PSA Tools and Techniques in Life Cycle Management of Maintenance and Operation of Complex System", IEEE Reliability and Maintainability Symposium, Jan. 26, 2004; pp. 492-499.
Liudong Xing "Maintenance-Oriented Fault Tree Analysis of Component Importance", IEEE Reliability and Maintainability Symposium, Jan. 26, 2004; pp. 534-539.
T. Assaf et al. "Diagnostic Expert Systems from Dynamic Fault Trees", RAMS, IEEE, Jan. 26, 2004; pp. 444-450.

(Continued)

*Primary Examiner* — Bryce Bonzo
(74) *Attorney, Agent, or Firm* — Staas & Halsey LLP

(57) ABSTRACT

A technical system is broken down into a plurality of subsystems, each of which is allocated a time-dependent distribution function which describes the probability of failure of the respective subsystem. The distribution functions are linked to one another to form a time-dependent system distribution function which describes the probability of failure of the technical system.

10 Claims, 21 Drawing Sheets

OTHER PUBLICATIONS

R.R. Basilio et al. "A Systematic Risk Management Approach Employed on the CloudSat Project", IEEE Aerospace Conference Proceedings, Mar. 17, 2001; pp. 1-469 to 1-479.

G.K. Palshikar "Temporal Fault Trees", Information and Software Technology, vol. 44, Mar. 15, 2002; pp. 137-150.

L. Camarinopoulos et al. "A Method for Automatic Fault Tree Synthesis", Applied Informatics, vol. 27, No. 9, Sep. 1985; pp. 389-399.

International Search Report mailed Oct. 16, 2007 and issued in corresponding International Patent Application No. PCT/EP2007/050436.

* cited by examiner

Basic function and derivative after t0, t0=20h, lambda=0.000001

Derivative ((B1 or B2) after t0), as well as (B3 after t2)

FIG 13
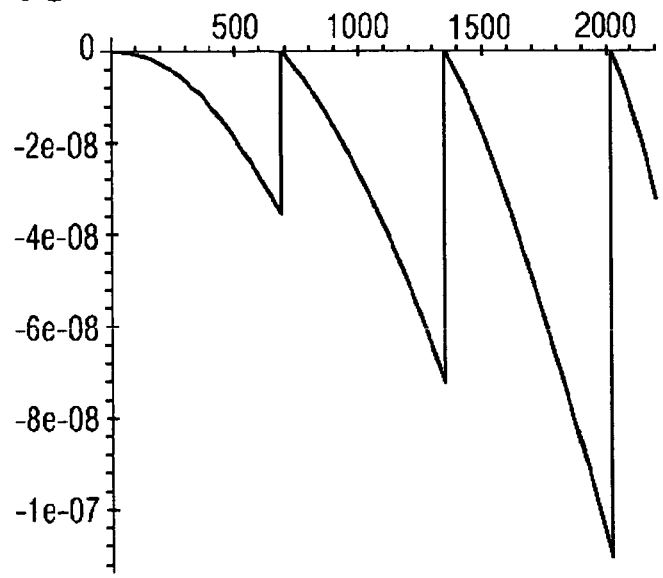
FIG 14    Derivative ((B1 or B2) *B3) after t0
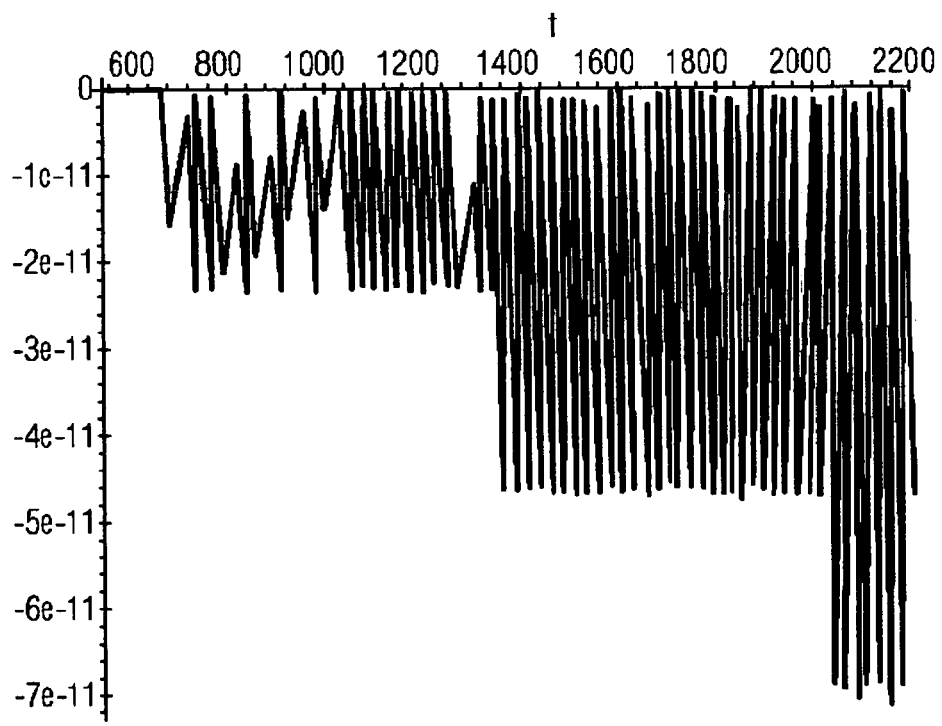

FIG 15 Derivative ((B1 or B2) *B3) after t0
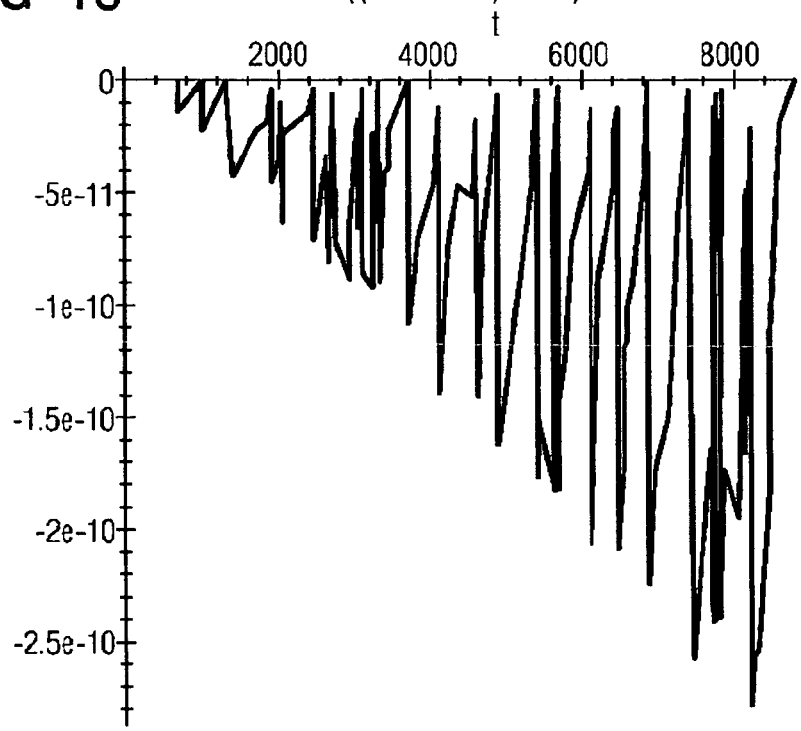
FIG 16 Derivative ((B1 or B2) *B3) after t2
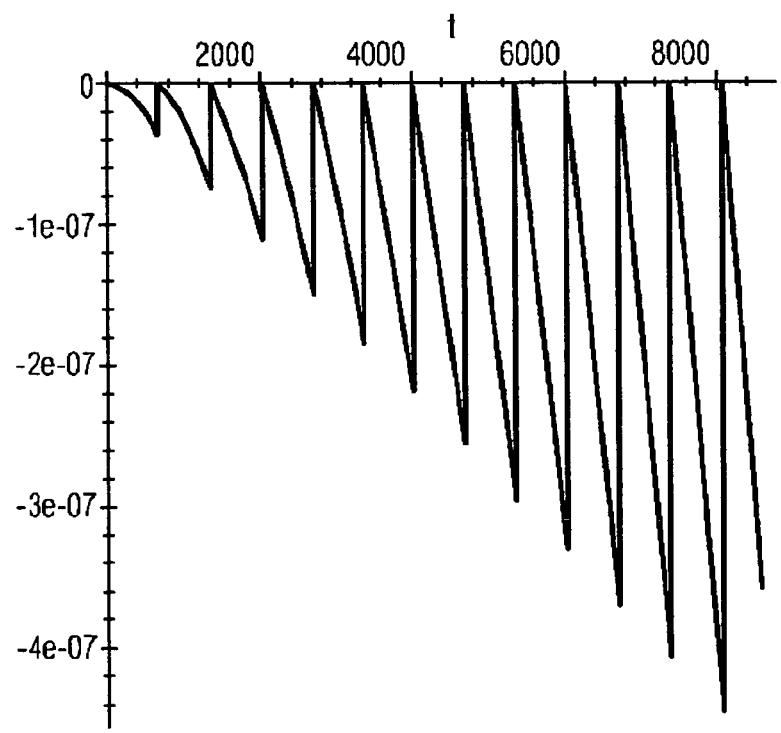

FIG 17 Function (B1 or B2)/100 and also its derivative after t0
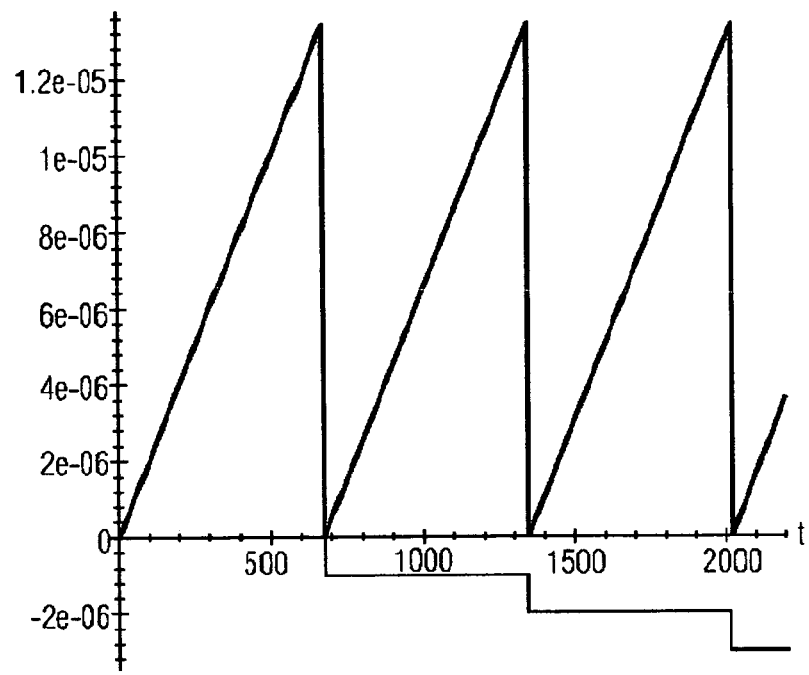
FIG 18
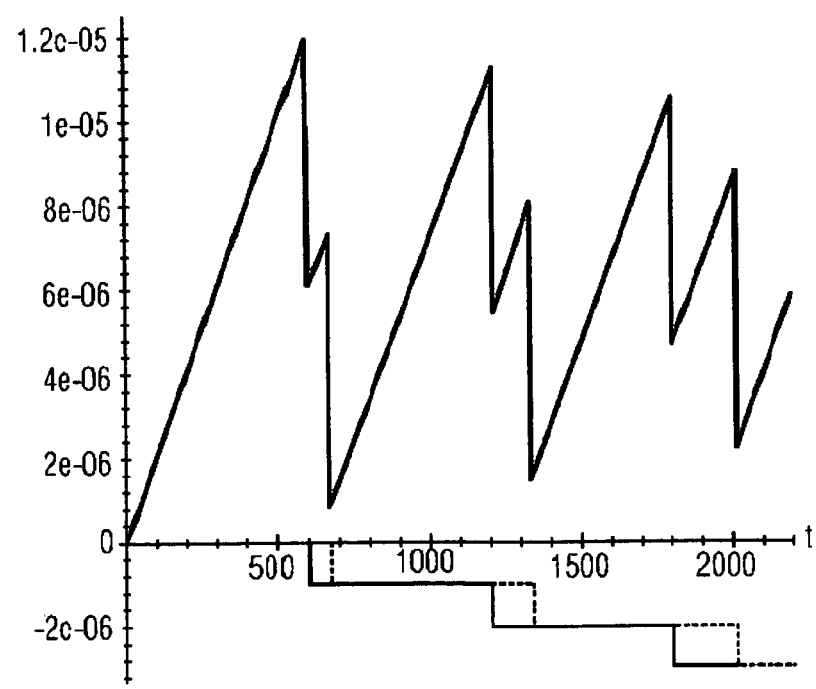

Function (B1 or B2)/100 and also its derivative after t0 and t1

TE for (t0=600, t2=20), (t0=630, t2=25), (t0=660, t2=30)

FIG 23
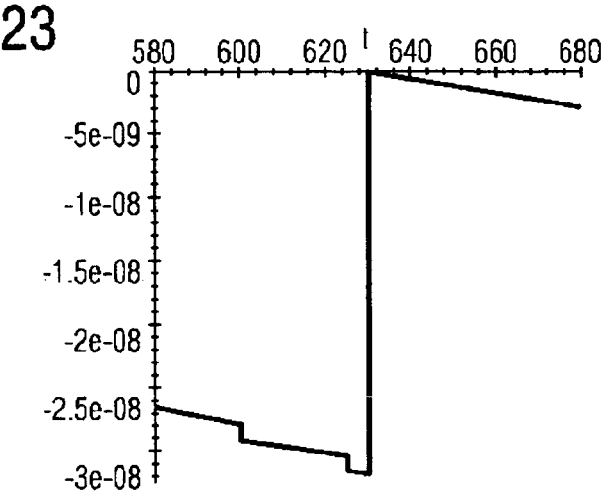
FIG 24  TE for (t0=t1=630, t2=var., t=590/635)
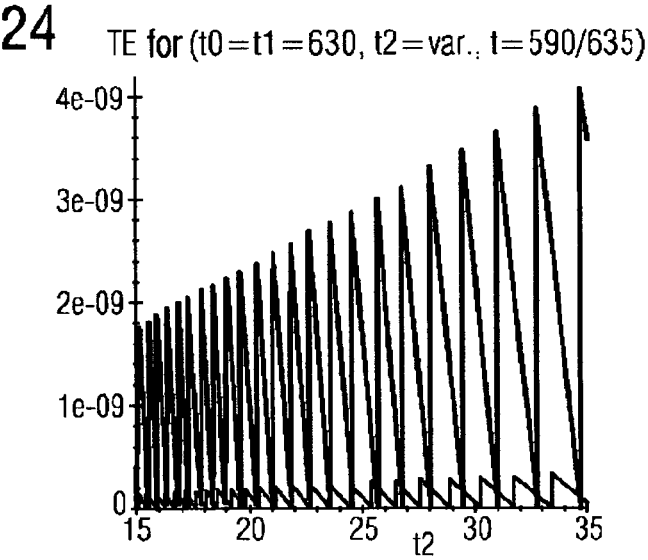
FIG 25  TE for (t0=t1=var., t2=25, t=590/635)
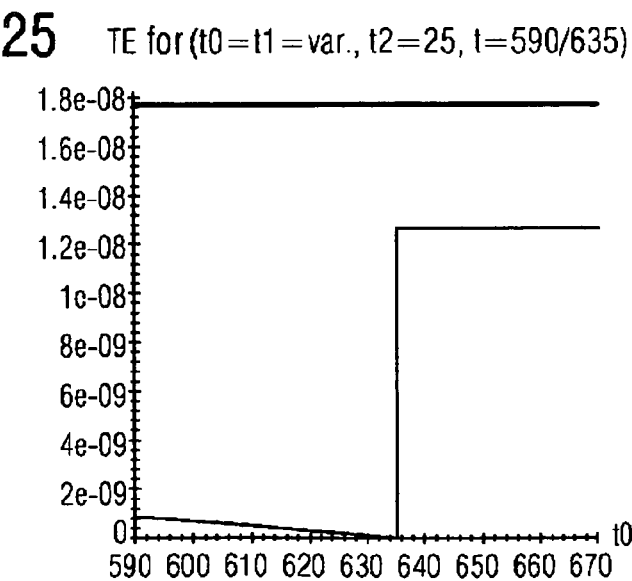

FIG 32    TE for (t0=t1=600, t2=25)
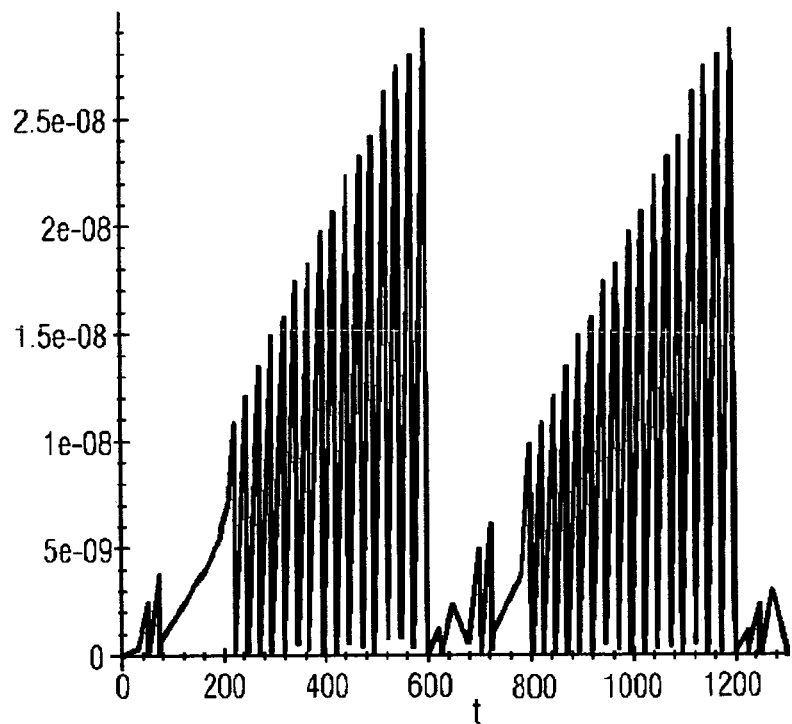
FIG 33    TE for variation from t0
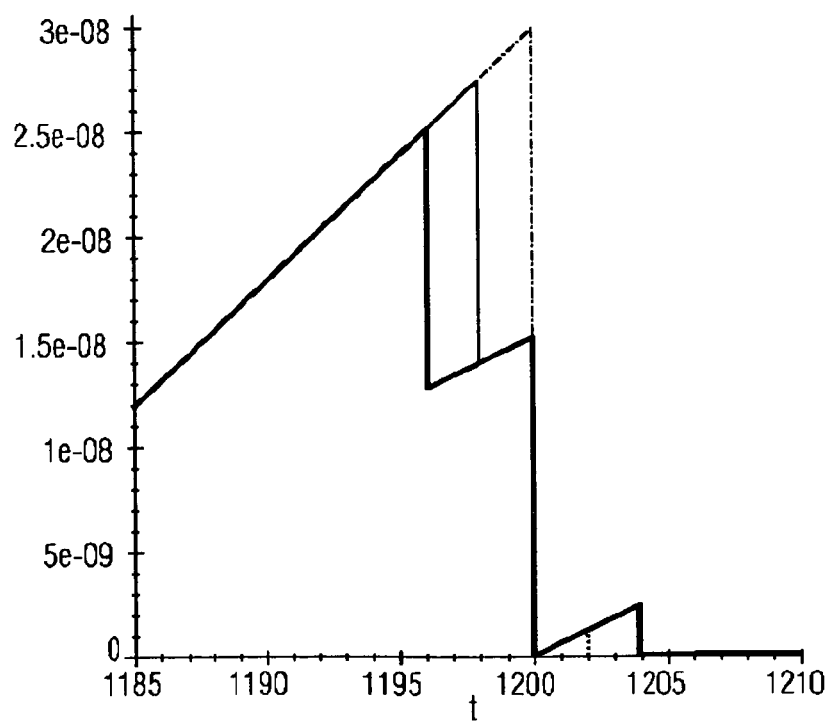

TE for (t0=550, t1=600, t2=650)

TE for (t0=550, t1=600, t2=650)

FIG 41 TE for (t0=550, t1=600, t2=650)
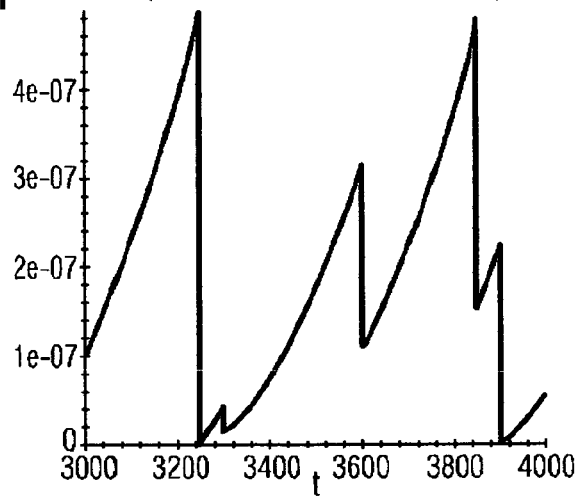
FIG 42 TE for variation from t0
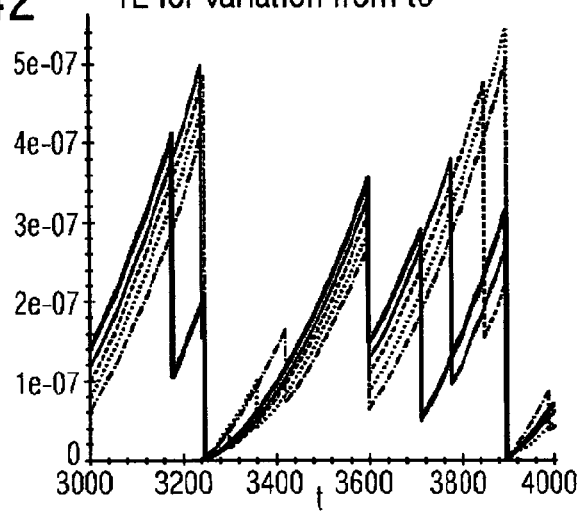
FIG 43 TE for variation from t1
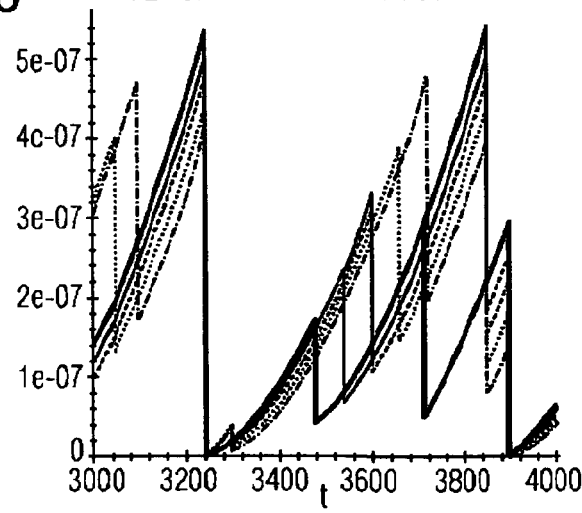

FIG 44 
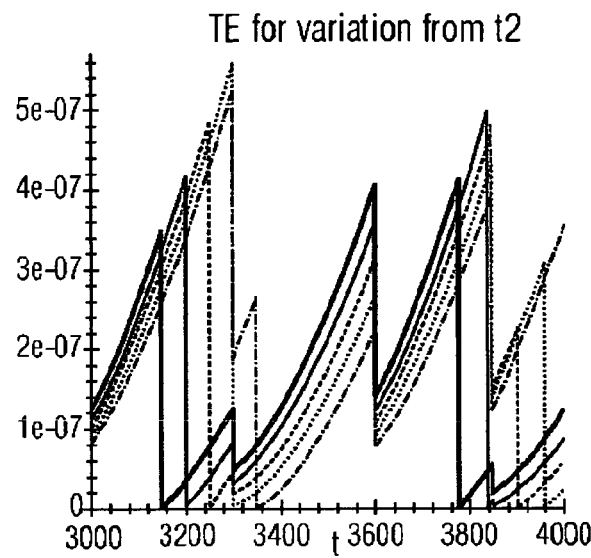
FIG 45 Derivation after t1 for (t0=550, t1=600, t2=650)
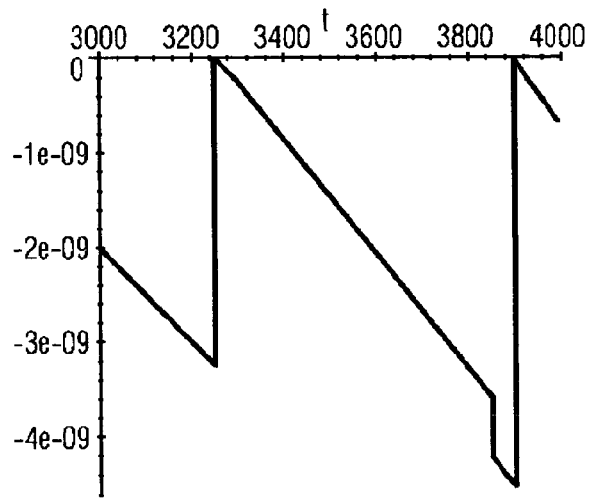
FIG 46 Derivation after t1 for (t0=550, t1=600, t2=650)
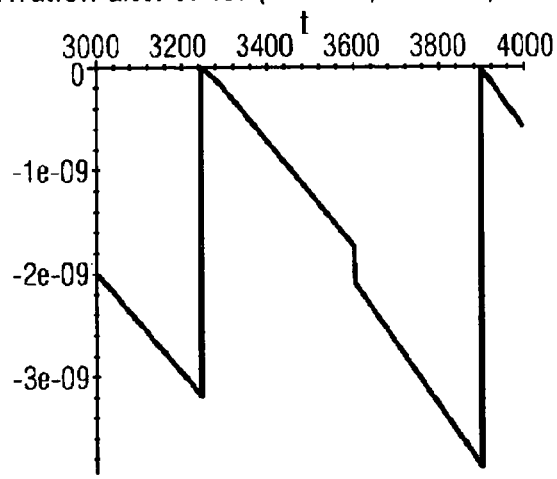

FIG 47  Derivation after t2 for (t0=550, t1=600, t2=650)
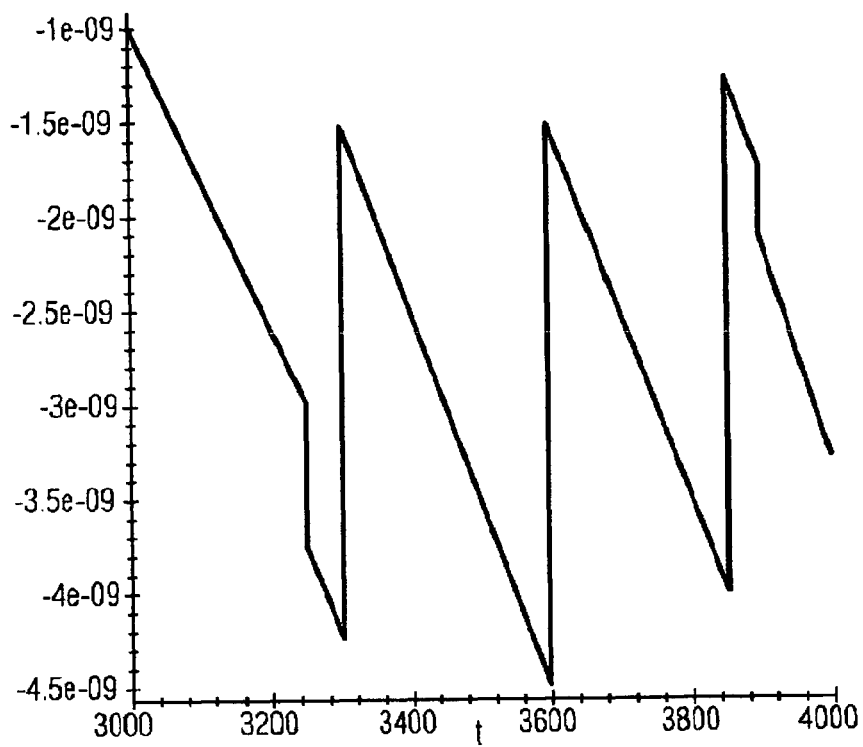
FIG 48  Optimization of the max. values from TE to 3e-7
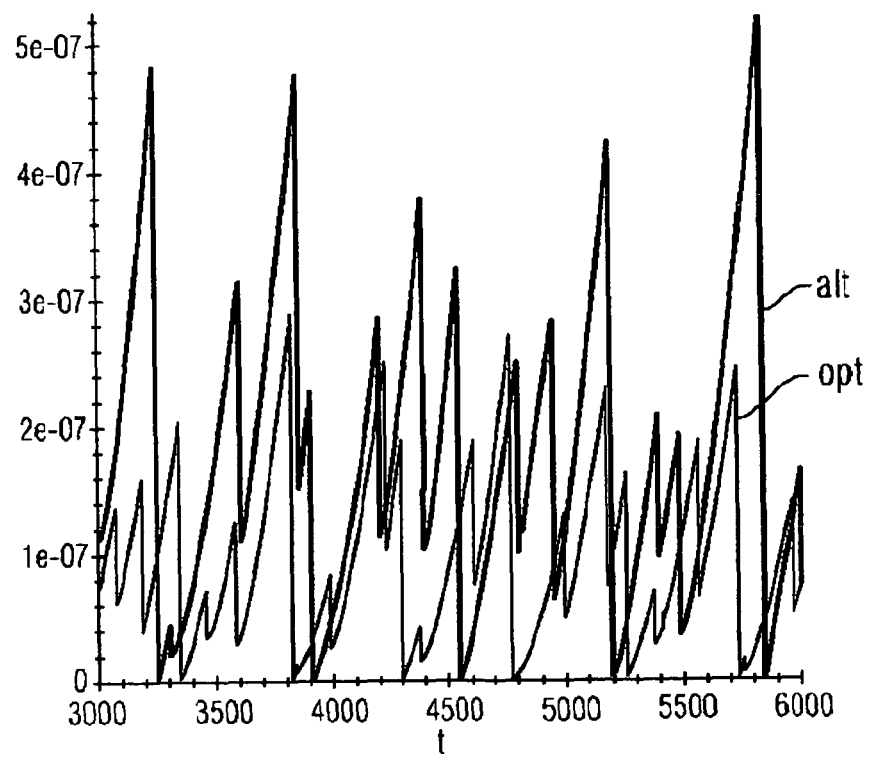

METHOD FOR ERROR TREE ANALYSIS

CROSS REFERENCE TO RELATED APPLICATIONS

This is the U.S. national stage of International Application No. PCT/EP2007/050436, filed Jan. 17, 2007 and claims the benefit thereof. The International Application claims the benefit of Germany Application No. 10 2006 019 896.4 filed on Apr. 28, 2006, both applications are incorporated by reference herein in their entirety.

BACKGROUND

Described below is a method for fault tree analysis, with a technical system being split up into a number of subsystems, to each of which is assigned a time-dependent distribution function which describes the probability of failure of the respective subsystem.

In complex technical systems it is often important to find suitable maintenance strategies for individual components of the system. The question which arises here relates to which component has to be replaced or maintained when and how often in order to achieve an optimum result for the technical system in respect of the target "high availability/reliability". In addition there is the matter of prioritizing maintenance, meaning that those components of which the maintenance has the greatest effect on the availability/reliability are given priority for maintenance. An objective is now to vary the maintenance times of individual components so that the maximum probability of failure of the overall system computed with these maintenance times is less than a predetermined critical probability of failure. Previously the problem has been resolved by estimating maintenance strategies on the basis of operational experience. This process can be subjective and not very transparent.

SUMMARY

An aspect is to find more objective criteria where possible, on the basis of which maintenance strategies can be developed.

In the method for fault tree analysis a technical system is split up into a number of subsystems, to each of which is assigned a time-dependent distribution function which describes the probability of failure of the respective subsystem with the distribution functions being linked to each other to form a system distribution function describing the probability of failure of the technical system and depending on the time.

The inventors have recognized that by forming a system distribution function, which is dependent on the time, describing the probability of failure of the technical system the option is created, through mathematical or numerical evaluation of this distribution function, of arriving at criteria from which a maintenance strategy is able to be derived. Since these criteria are computed and not estimated as a result of operational experience, there is a comparatively high level of objectivity in determining these criteria.

The logical connections between the distribution functions of the subsystems can be logical OR operations. Logical AND connections are possible as an alternative or in addition.

The system distribution function can be dependent on mission times which form parameters of the system distribution function. These mission times are especially assigned to the subsystems. Furthermore the mission times can represent maintenance times or maintenance intervals for the subsystems.

To reduce the probability of the technical system failing or to develop a maintenance strategy, the following can be executed:

First, a maximum probability of failure of the technical system is defined.

Second, that mission time which has the greatest influence on this maximum of the probability of failure is defined.

Third, the mission time determined in the second step is varied.

Next, the maximum of the probability of failure of the technical can be determined, but this time taking into account the varied mission time. Then, the maximum of the probability of failure determined can be compared to a predetermined probability of failure. Thereafter there can be a return to defining the . mission time, if the result of the comparison has been that the maximum of the probability of failure determined is greater than the predetermined probability of failure. If on the other hand the maximum of the probability of failure of the technical system is less than or is less than or equal to the predetermined probability of failure, this optimization of the maintenance strategy can be aborted since the desired requirements are already fulfilled.

The mission time is varied especially by the mission time being minimized. Furthermore the maximum of the probability of failure or of each probability of failure of the technical system may be determined within a specified time interval. The probability can be evaluated numerically, e.g. using a digital computer.

The maximum of the probability of failure of the technical system is especially determined in the following way:

Determination of a constant,

Determination of differences between multiples of all mission times within the interval and the constant, Determination of the function values of the system distribution function for the differences as arguments, Determination of the maximum of the function values thus determined with the corresponding argument.

The mission time which has the greatest influence on the maximum of the probability of failure of the technical system is especially determined in the following manner:

Determine the derivatives of the system distribution function after the mission times at the point at which the maximum of the probability of failure of the technical system lies, Determine the maximum value of these derivatives and the associated mission time.

The variation of the mission time which has the greatest influence on the maximum of the probability of failure of the technical system is especially undertaken as follows:

The value of the mission time is multiplied by a factor which is less than 1 (the following applies in particular: 0<factor<1).

The probability of failure can be determined for each point in time within the operating time of the technical system (system mission time). As a function over time the probability of failure referred to as a system distribution function. The system distribution function is calculated via the distribution functions of the basic events or subsystems in the "bottom-up" fault tree by evaluating AND or OR logic operations in accordance with the laws of probability calculation.

An aspect is to vary the maximum probability of failure of the overall system (especially to minimize it) so that it is equal to a predetermined critical probability of failure or falls below the probability.

For this the maximum probability of failure or the point in time associated with this is first determined. At this point that mission time which has the greatest influence on the maximum probability of failure is determined. In this method, the mission time is explicitly varied (minimized), so that the maximum probability of failure also reduces. After a recalculation of the maximum probability of failure for the modified mission time the new maximum probability of failure is compared with the predetermined critical probability of failure (abort criterion) and if necessary the most sensitive mission time once more is varied, etc.

An advantage of this technical process is that the mission parameters can now be varied so that the maximum probability of failure of the overall system is below a predetermined critical probability of failure. This enables maintenance strategies to be specified a priori with mathematical safeguards. In addition options are produced in this way of explicitly maintaining components and thus obtaining an optimization of costs versus availability/reliability. Often static fault tree models are available for a technical system area which can be directly further used for the method.

The term mission time can be taken to a mean a deployment time or a deployment period in which maintenance and repair work is not possible at all or is only possible to a restricted extent. Mission times can in such cases be assigned to the technical system as the overall system, but also to the components or subsystems.

In particular the term subsystem is to be interpreted as non-restrictive, so that basically any logical and/or physical subunit or part unit of the technical system can form a subsystem. This also may enables events, such as basic events for example, to form subsystems of the technical system.

The method is explained in greater detail below with reference to exemplary embodiments with the aid of the figures, with only the features necessary for the understanding of the method being shown and the following reference symbols being used: 1: Determination of the maximum Max{TE(t)} of the function TE(t, $MZ_1$, $MZ_2$ ...) as well as of the associated argument $t_{max}$; 2: Determination of the maximum of the partial derivatives of TE(t, $MZ_1$, $MZ_2$ ...) according to the parameters $MZ_1$, $MZ_2$... at point $t=t_{max}$ and of the associated mission time parameter $MZ_i^{max}$; 3: Variation of the mission times or of the mission time parameter $MZ_i^{max}$; 4: Checking whether Max{TE (t)} is less than or equal to the predetermined value $TE^{Soll}$; alt: Curve of TE before optimization; opt: Curve of TE after optimization.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 13 is a graph of derivation of the composite function after t2;
FIG. 14 is a graph of derivation of the composite function after t0;
FIG. 15 is a graph of derivation of the composite function after t0;
FIG. 16 is a graph of derivation of the composite function after t2;
FIG. 17 is a graph of an OR function with derivative, equal maintenance intervals;
FIG. 18 is a graph of an OR function with derivative, equal maintenance intervals;
FIG. 23 is a graph of derivation of TE after t2;
FIG. 24 is a graph of function TE over t2;
FIG. 25 is a graph of function TE over t0;
FIG. 32 is a graph of TE over t for t0=t1=600 and t2=25;
FIG. 33 is a graph of TE functions for different t0;
FIG. 41 is a graph of TE over t for t0=550, t1=600 and t2=650;
FIG. 42 is a graph of TE functions for different t0;
FIG. 43 is a graph of TE functions for different t1;
FIG. 44 is a graph of TE functions for different t2;
FIG. 45 is a graph of derivation after t0 for t0=550, t1=600 and t2=650;
FIG. 46 is a graph of derivation after t1 for t0=550, t1=600 and t2=650;
FIG. 47 is a graph of derivation after t2 for t0=550, t1=600 and t2=650;
FIG. 48 is a graph of TE with optimized values.

DETAILED DESCRIPTION OF THE PREFERRED EMBODIMENT

Figure 1:
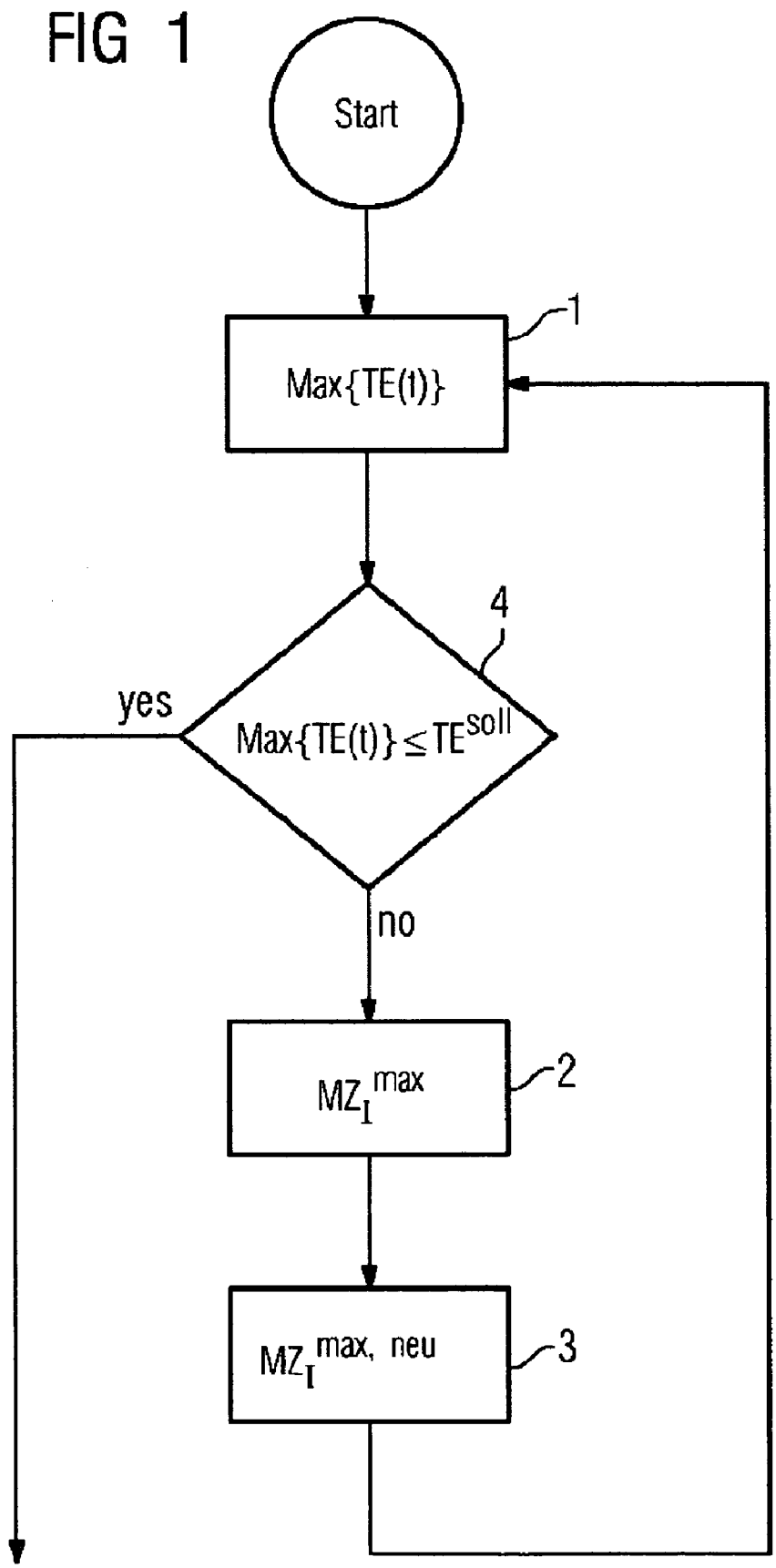
FIG. 1 is a flowchart in accordance with an embodiment.

Reference will now be made in detail to the preferred embodiments, examples of which are illustrated in the accompanying drawings, wherein like reference numerals refer to like elements throughout.

FIG. 1 shows a flow diagram in accordance with an embodiment. The aim here is the minimization of a function "TopEreignis (top event)" (TE) depending on time t and parameters "mission times" ($MZ_1$)

$$TE(t, MZ_1, MZ_2, MZ_3, MZ_4, \ldots)$$

over a given interval [BCL, BCR] (Boundary Conditions Left/Right) so that the following applies:

$$MAX_{BCL \leq t \leq BCR} \{TE(t, MZ_1, MZ_2, MZ_3, M_4, \ldots)\} \leq TE^{Soll}$$

$TE^{Soll}$ in this case is a predetermined maximum, critical probability of failure for top event. $TE(t, MZ_1, MZ_2 \ldots)$ is especially the time-dependent system distribution function.

First, the maximum of the function TE(t) in the given interval is determined. In this case the maximum of the function close to the mission times $MZ_i$ or shortly before the mission times, more specifically at time $t=MZ_i-\epsilon$ can be assumed.

The multiples of all mission times $k*MZ_i$ within the given interval are determined, the function at the point $t_k=k*MZ_i-\epsilon$ (with e.g. $\epsilon=0.0001*k*MZ_1$) evaluated, and the maximum of the function values thus established determined with the corresponding argument $t_{max}$. The value k may be a whole number, especially a natural number.

Second, the maximum of the derivative is determined at the point of the argument $t_{max}$. In this case the derivatives of the function TE(t) are evaluated according to the mission parameters at the just determined point $t_{max}$ and the maximum value of these derivative values or the associated mission parameter $MZ_i^{max}$ is determined.

Third, a variation of mission times is undertaken. In this case the found mission parameters $MZ_i^{max}$ are reduced, e.g. through $MZ_i^{max}$, neu=$0.99*MZ_i^{max}$, after which there is a return with the modified mission time to the first operation.

Finally, an abortion of the method is checked. In other words, the first three operations are repeated until the computed maximum value $TE(t_{max})$ is less than or is less than or equal to the predetermined value $TE^{Soll}$.

The method for the analysis can be divided up into a number of operations:

As with classic, static Fault Tree Analysis (FTA), the predetermined system is split up into a number of subsystems with a top event as the root, the leaves of the subsystem correspond to the basic events.

These leaves have failure probabilities for a defined failure event, from which e.g. for an exponential distribution the constant failure rate is determined. The probabilities of failure of the individual components are specified—as previously—as a function over time, e.g. as an exponential distribution over time.

By contrast with static FTA, the evaluation of these probabilities of failure for subsystems is now undertaken in the top event direction not statically but dynamically, i.e. possible "AND" and "OR" connectors for subsystems are likewise depicted functionally over time, e.g. with the aid of approximating functions or by symbolic function diagrams. The top event is then likewise available as a function over time.

For approximating functions corresponding basic function can be selected, of which the coefficients can be adapted in accordance with the specifications by the solution of a non-linear equation system.

In the solution by symbolic formula calculation the limits of this calculation can be defined for example in relation to the number of possible basic events.

If a highest probability of failure still permissible $P_{krit}$ is now specified for the top event, i.e. a critical size for the computed probabilities of failure of the overall system, the associated $t_{krit}$ can then be computed for this, i.e. the associated (critical) point in time as from which the overall system will exceed this predetermined probability of failure.

an object of dynamic fault tree analysis is the computation of that point in time from which the investigated system will exceed a predetermined critical probability of failure.

Further, an optimization of maintenance strategies can be undertaken, based on the above-mentioned dynamic fault tree analysis.

A boundary condition in this case is a computed or planned probability of failure $P_{Plan}(t)$ over time t with $$P_{Plan}(t) < P_{krit}(t), \text{ for } t_{start} < t < t_{End}.$$

The overall probability of failure of the system should thus always be less than a critical value. The actual optimization target (or the definition of a number of targets to be achieved) is still to be analyzed, optimization targets can for example be
longest possible maintenance intervals,
preferred replacement of "easily accessible" components (while fulfilling the optimization condition),
preferred replacement of "financially low-cost" components (while fulfilling the optimization condition),
preferred replacement of only those components of which the then improved probability of failure has a marked influence/improvement effect on the overall probability of failure.

The above-mentioned basic functions for approximation of a functional behavior with maintenance strategies can be adapted in this case to correspond to a "saw-tooth" exponential distribution.

The above optimization can also lead to a sensitivity analysis of the overall probability of failure in respect of the probabilities of failure of the basic events: What is the influence of the maintenance of basic event "i" on the overall probability of failure, does maintenance for this basic event "i" have any corresponding (clear) effect at all?

An aspect is the formulation of an optimum maintenance strategy of an overall system, so that by adhering to a critical probability of failure of the overall system in the given life cycle the individual components can be replaced according to defining criteria (cost-effective, ease of access, . . . ).

Figure 2:
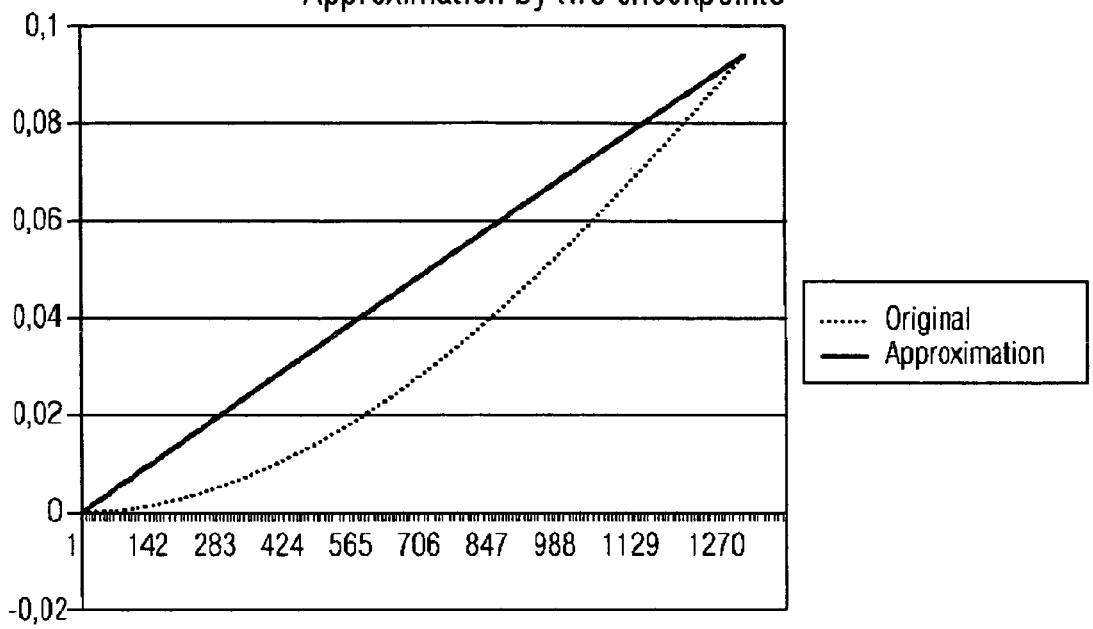
FIG. 2 is a graph of an approximation of a distribution function.
Figure 3:
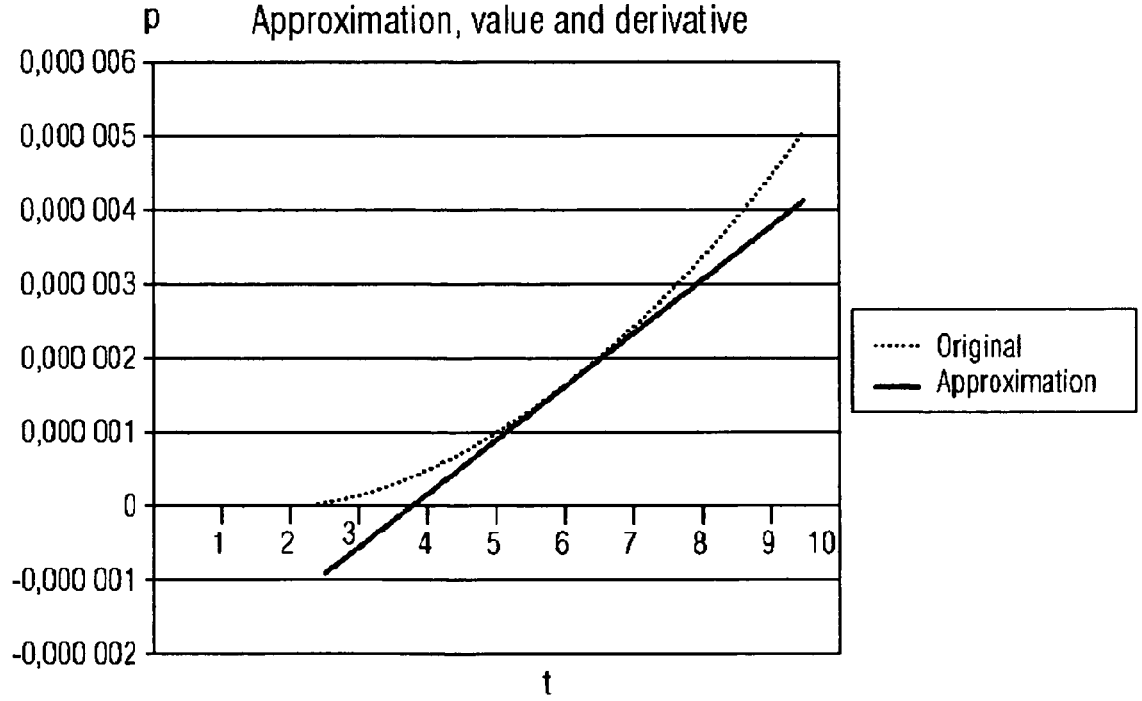
FIG. 3 is a graph of an approximation of a distribution function.

First, the probability distributions for the basic events are each specified explicitly. In this case for this distribution the general form $$p(t)=a-b*\exp(c*t)$$

or the specific form for a distribution function $$p(t)=1-\exp(-\lambda*t)$$

should be used. This general form results from the experience that two checkpoints are too few for approximation. As can be seen from FIGS. 2 and 3, as well as two normal checkpoints for the function, the derivative at an intermediate point can also be approximated as a third criterion.

For possible repair strategies composite functions if ($t<t_1$) then $$p(t)=a_1-b_1*\exp(c1*t)$$

else $$p(t)=a_2-b_2*\exp(c2*t)$$

can be used. However problems can arise here by virtue of the lack of consistency/differentiability at the break point in respect of the planned optimization process.

Second, the logical operators "AND" and "OR" for are also to be defined for basic events or also for subsystems. In this case there is the following correspondence $P_1(t) \dot{P}_2(t) = P_1(t) + P_2(t) - P_1(t) * P_2(t)$ or $P_1(t) \hat{} P_2(t) = P_1(t) * P_2(t)$.

Figure 4:
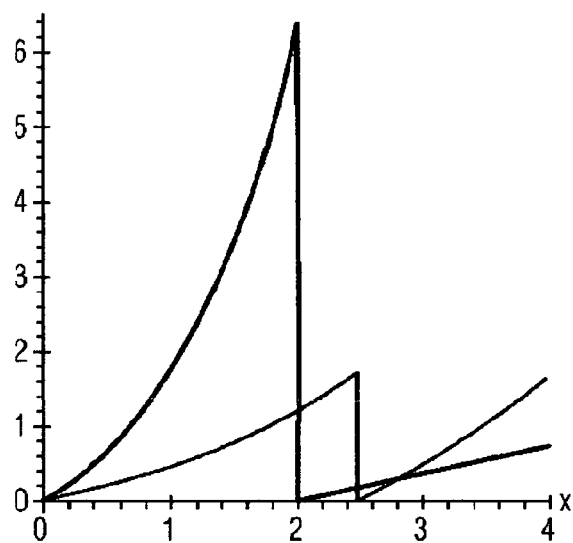
FIG. 4 is a graph of two functions.
Figure 5:
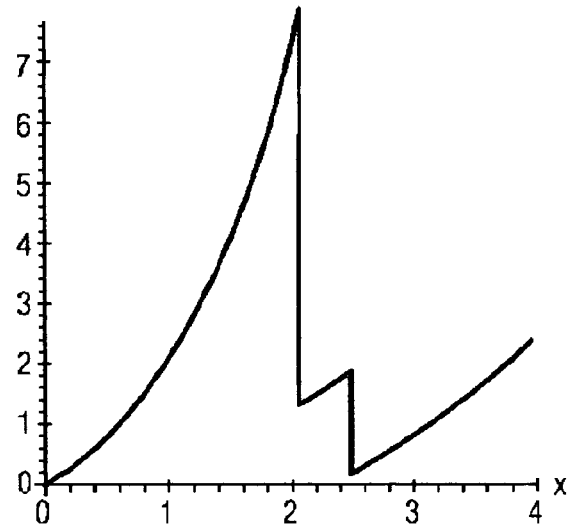
FIG. 5 is a graph of an addition of the functions according to FIG. 4.
Figure 6:
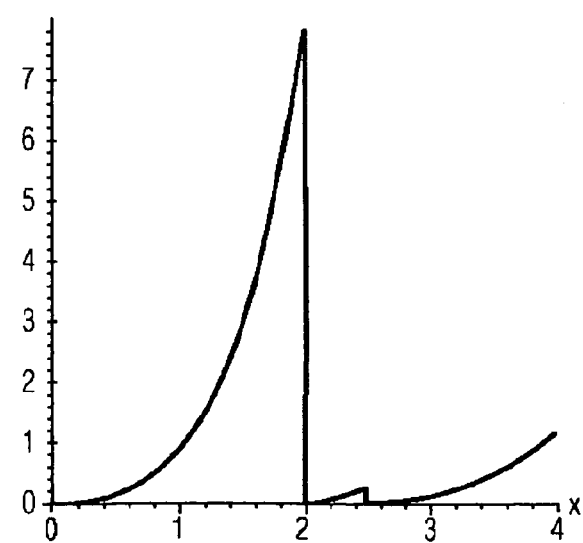
FIG. 6 is a graph of a multiplication of the functions according to FIG. 4.

For the two functions visible from FIG. 4 the addition of the function values from FIG. 5 and the multiplication of the function values from FIG. 6 can be seen. Here too consistency/differentiability with respect to optimization is to be considered.

In order to establish which changes of mission times have the greatest effect on the system reliability (sensitivity analysis), the "system distribution function" is derived.

Let $a,b \in CR$ with $b>0$. Then there are uniquely defined numbers $q \in Z$, $r \in R$ with $a = bq + r$, $0 <= r < b$.

The following is defined: $r := a \mod b$.
Derivation of the system function:

$q := \lfloor t/t_0 \rfloor$ (Gaussian bracket), $t_0$ does not divide $t$ $d/dt_0 [\exp(-\lambda(t \mod t_0))] = d/dt_0 [\exp(-\lambda(t - q\, t_0))] - \exp(-\lambda t) [\ddot{e}(dq/dt_0 * t_0 + q) \exp(\lambda q\, t_0)] = \lambda q \exp(-\ddot{e}(t \mod t_0))$ An example for an analysis with the aid of software is given below (the function "trunc" truncates the decimal places from a number):

first new procedure:

RealModulo $(x, q) = x - \text{trunc}(x/q) * q$;

second new procedure:

ExpModulo $(t, \text{lamda}, t0) = 1 - \exp(-\text{lamda} * \text{RealModulo}(t,t0))$;

third new procedure: "and" of Basisfkt

B1_and_B2$(t, \text{lamda1}, t0, \text{lamda2}, t1) = \text{ExpModulo}(t, \text{lamda1}, t0) * \text{ExpModulo}(t, \text{lamda2}, t1)$;

fourth new procedure: "or" of Basisfkt

B1_or_B2$(t, \text{lamda0}, t0, \text{lamda1}, t1) = \text{ExpModulo}(t, \text{lamda0}, t0) + \text{ExpModulo}(t, \text{lamda1}, t1) - \text{ExpModulo}(t, \text{lamda0}, t0) * \text{ExpModulo}(t, \text{lamda1}, t1)$;

fifth new procedure: TopEreignis

Figure 7:
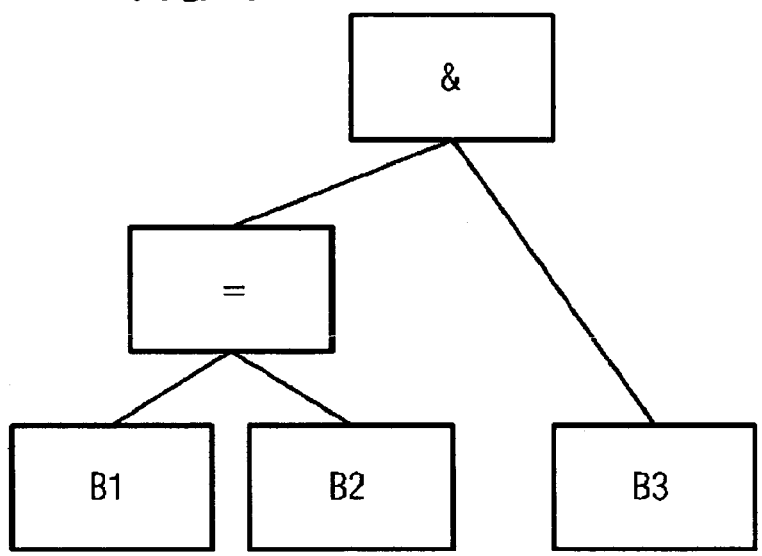
FIG. 7 is a fault tree diagram.

TopEreignis $(t, \text{lamda0}, \text{lamda1}, \text{lamda2}, t0, t1, t2) = B1\_\text{or}\_B2(t, \text{lamda0}, t0, \text{lamda1}, t1) * \text{ExpModulo}(t, \text{lamda2}, t2)$;

A diagram of the overall fault tree (B1 or B2) and B3 can be seen in FIG. 7.

Figure 8:
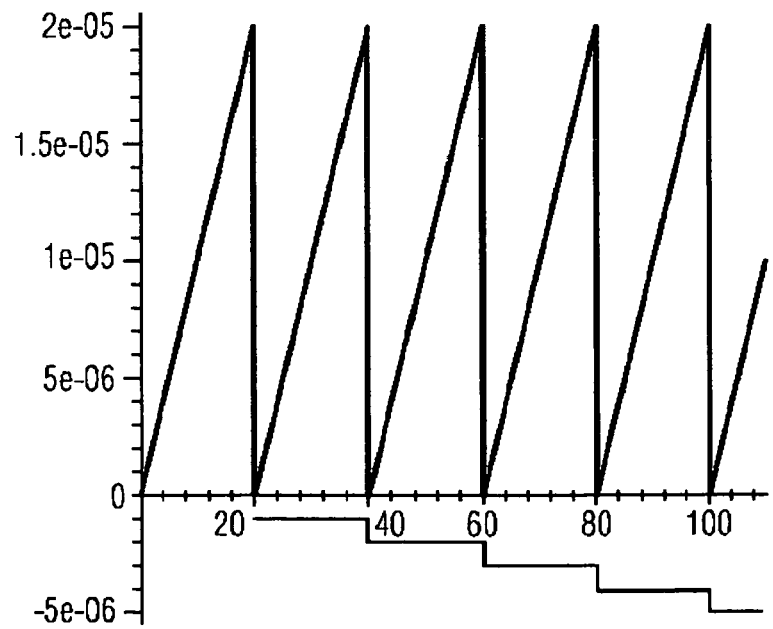
FIG. 8 is a graph of a basic function with derivative.

Subsequently the derivatives are computed, with following function being given:

OrgFunktion $:= 1 - \exp(-\text{lamda0}*(t - \text{trunc}(t/t0)*t0))$ its derivative after t0 computes to diffOrgFunction $:= \text{lamda0}*(-\text{trunc}(1,t/t0)*t0 - \text{trunc}(t/t0))*\exp(-\text{lamda0}*(t - \text{trunc}(t/t0)*t0))$ The function trunc(1,t/t0) in this case corresponds to the first derivative of trunc and should therefore always be 0. FIG. 8 shows a schematic of the basic function with its derivative after t0.

The functions

Figure 9:
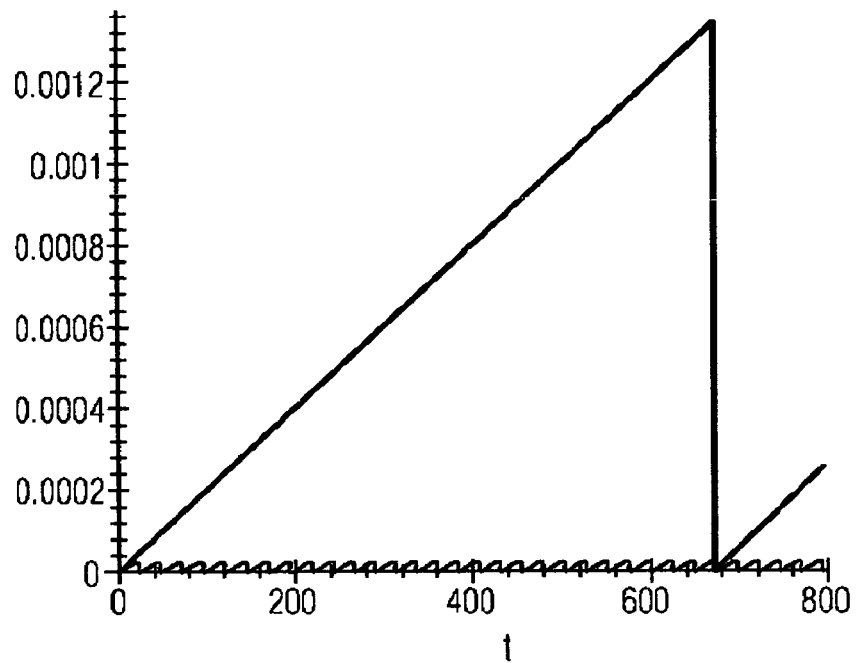
FIG. 9 is a graph of two functions.
Figure 10:
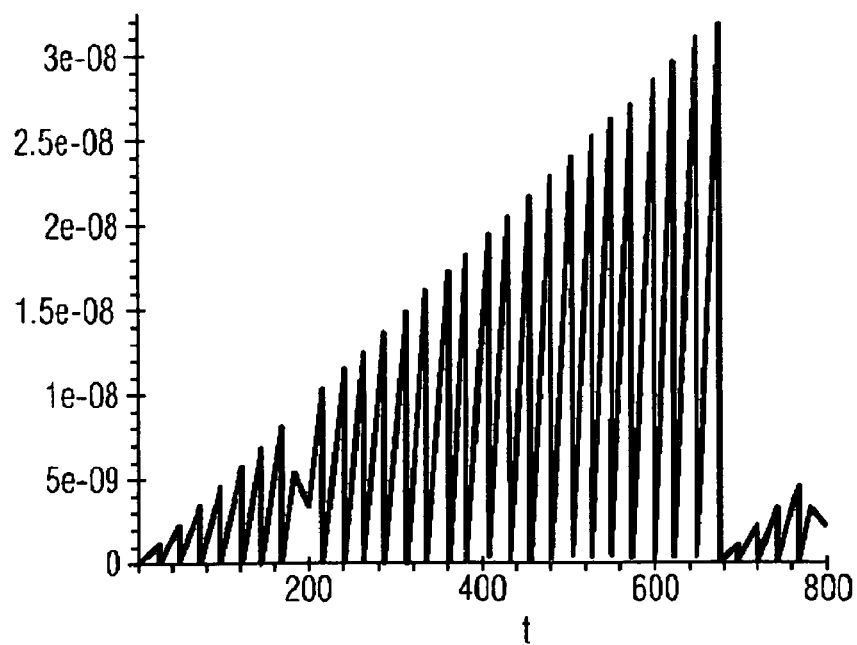
FIG. 10 is a graph of an ANDing of the functions according to FIG. 9.

Basic function $B1$:lambda:=0.000001, $t0$:=672;

Basic function $B2$:lambda:=0.000001, $t1$:=672;

Basic function $B3$:lambda:=0.000001, $t2$:=24;

can be seen in different logical combinations from FIG. 9 and FIG. 10, with FIG. 9 showing the function (B1 or B2) as well as the function B3 and FIG. 10 showing the function (B1 or B2) and B3.

Figure 11:
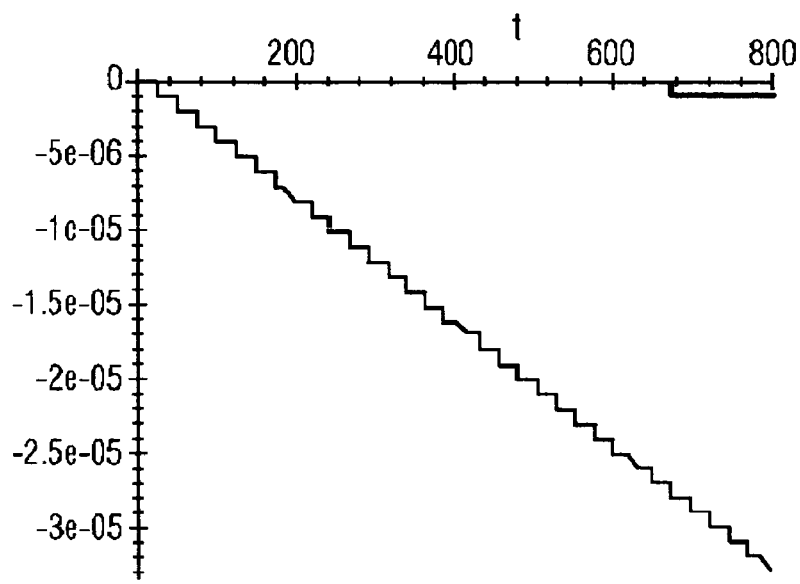
FIG. 11 is a graph of two derivatives of the functions according to FIG. 9.

Furthermore FIG. 11 shows, for the functions

Figure 12:
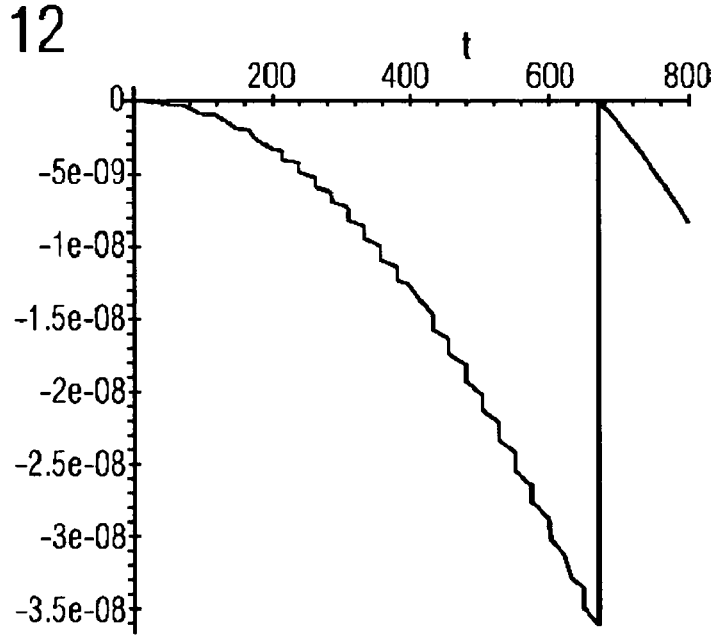
FIG. 12 is a graph of a derivative of a composite function after t2, especially the function according to FIG. 10.

Basic function $B1$: lambda 0.000001, $t0$:=672;

Basic function $B2$: lambda 0.000001, $t1$:=672;

Basic function $B3$: lambda 0.000001, $t2$:=24;

the derivative of (B1 or B2) after t0 as well as of B3 after t2. Furthermore FIGS. 12 and 13 shown the derivative after t2 of the product of the two functions (B1 or B2)*B3 in different time axis representations. FIG. 14 shows the derivative after t0 of the product of the two functions (B1 or B2)*B3.

FIG. 15 shows the derivative of the function (B1 or B2)*B3 after t0 and FIG. 16 the derivative of the function (B1 or B2)*B3 after t2 for a range up to t=8760 h, with the derivative after t0 no longer being able to be shown exactly by the software used. It is evident that the derivative after t2 is greater by orders of magnitude than that after t0 or t1

FIG. 17 shows the control function with same maintenance time interval as well as the derivative of this function after t0. Function (B1 or B2) was scaled with the factor 1/100, not however the derivative.

FIG. 18 shows the control function with unequal maintenance intervals as well as its derivative after t0 and t1, with t0=670, t1=600. Function (B1 or B2) was scaled with the factor 1/100, not however the derivative.

Figure 19:
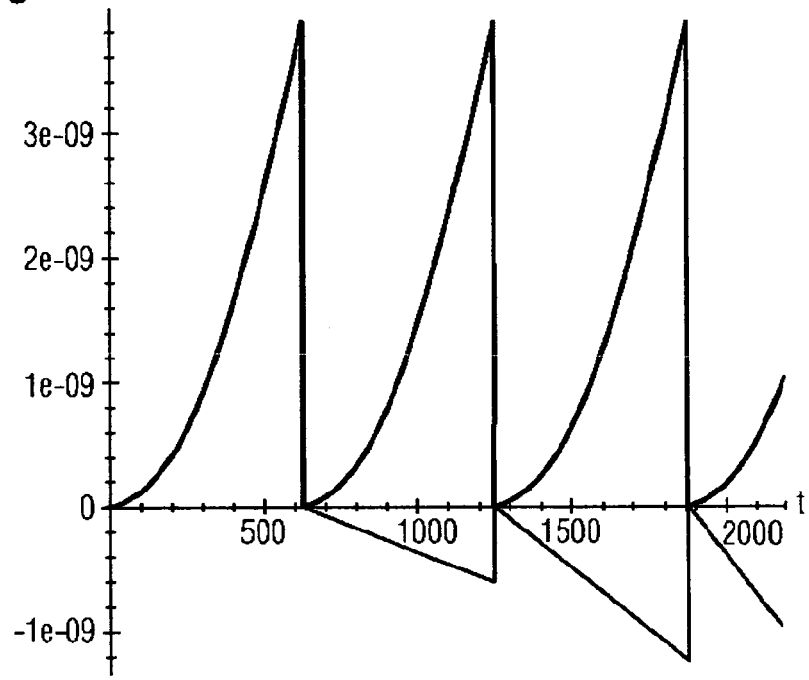
FIG. 19 is a graph of a basic function with derivative, equal maintenance intervals.

FIG. 19 shows the basic function with equal maintenance time intervals as well as its derivative after t0. Function (B1 and B2) was scaled with the factor 1/100, not however the derivative.

Figure 20:
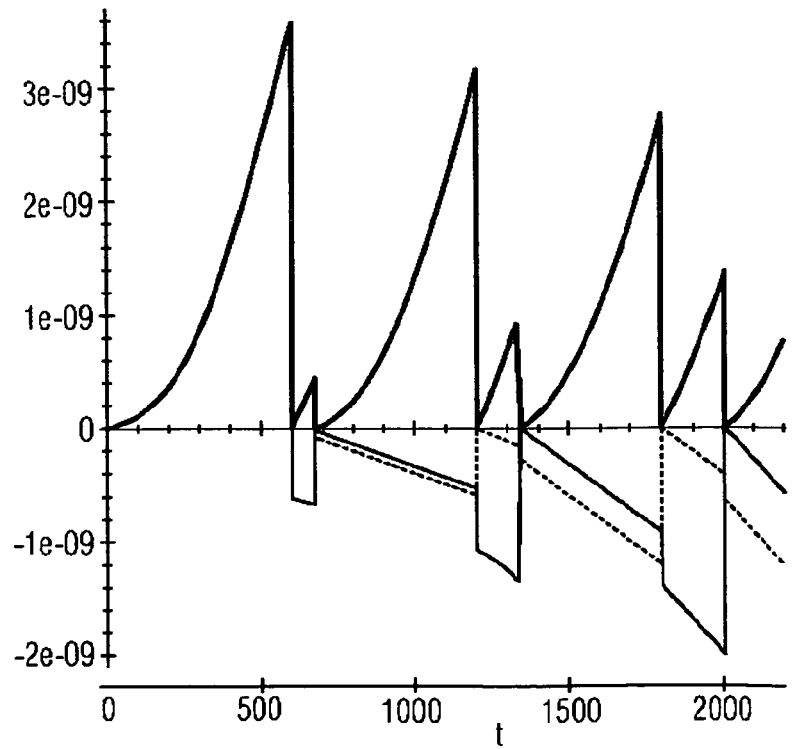
FIG. 20 is a graph of an AND function with derivative, unequal maintenance intervals.

FIG. 20 shows the basic function with unequal maintenance intervals as well as its derivative after t0 and t1, with t0=670, t1=600. Function (B1 and B2) was scaled with the factor 1/100, not however the derivative.

For interpretation of the derivatives the following should be noted: —Viewed from time "0" the change of a mission time has all the more of a sensitive effect for a later point in time, the further this later point in time lies in the future: The further the point in time lies in the future, the earlier changes of the mission time cause a different number of maintenance operations. Each maintenance operation however directly affects the probability of system failure.

For the "OR" operation the derivative is constant within a mission time: The failure rate of the exponentially distributed basic event is constant; thus a change of the mission time only then changes the conditional failure probability if the point in time comes into another number of maintenance intervals as a result.

For the "AND" operation the derivative within of a maintenance interval is initially 0 and then drops; with an increasing number of maintenance intervals it drops more steeply: At the beginning of a maintenance interval the failure rate of the component is 0; thus is does not cause any rise in the probability of system failure. With increasing time in the maintenance interval the failure rate increases, thus also the effect on the probability of system failure. The more the maintenance intervals lie in the future the more serious is the higher failure rate on the end of the mission time, since a shortening would have hidden these critical ends ever more often.

For the "AND" operation with two different mission times a maintenance of the basic event causes a rise in the sensitivity of the second basic event with the longer mission time: The higher failure rate of the second basic event now has sole influence on the probability of system failure and thus relatively has a greater weight.

For the function specified above $$(B1 \text{ or } B2) \text{ and } B3 \text{ or } F(t) := B1\_or\_B2(t, \text{lamda0}, t0, \text{lamda1}, t1) * \text{ExpModulo}(t, \text{lamda2}, t2);$$

the parameters $t_i$ will be varied.

Figure 21:
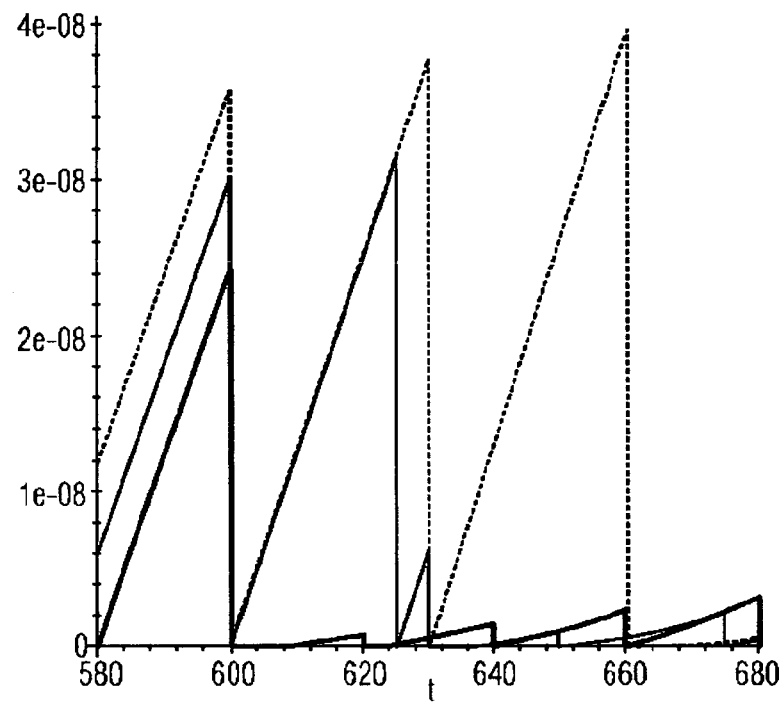
FIG. 21 is a graph of functions TE for different parameters.
Figure 22:
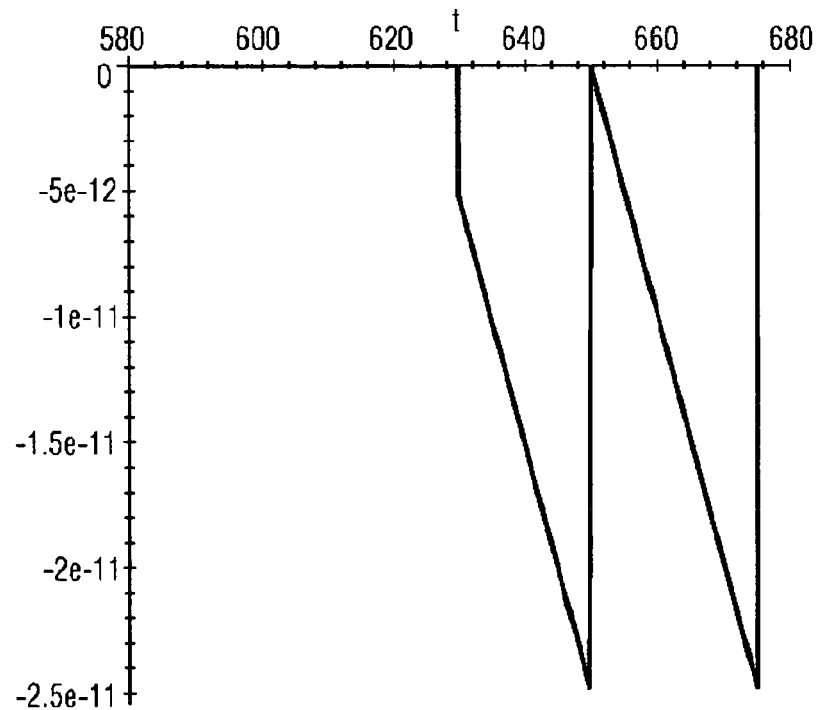
FIG. 22 is a graph of derivation of TE after t0.

FIG. 21 shows the top event from above TE=(B1 or B2) and B3 for (t0=600, t2=20), (t0=630, t2=25) and (t0=660, t2=30). The derivative after t0 for (t0=630, t2=25) can be seen from FIG. 22. FIG. 23 shows the derivative of TE after t2 for (t0=630, t2=25).

FIG. 24 shows TE for (t0=t1=630, t2=var, t=590/635). FIG. 25 also shows TE for (t0=t1=var, t2=25, t=590/635). The expression "var" means that TE is plotted over t2 or t0, as can be seen from FIG. 24 and 25. In addition the character "/", means that TE is shown both for t=590 as also for t=635.

Figure 26:
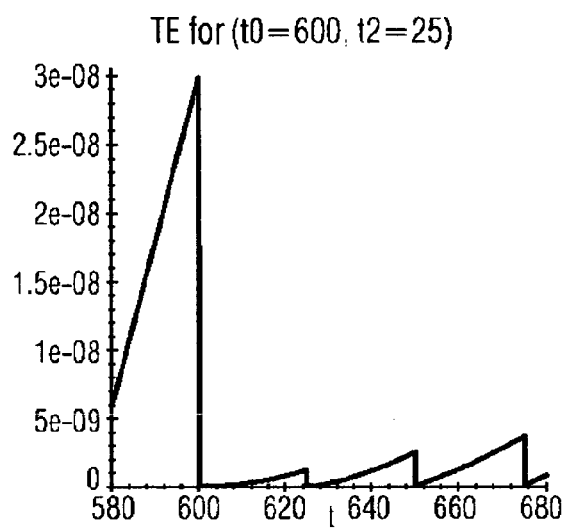
FIG. 26 is a graph of TE over t for t0=600 and t2=25.
Figure 27:
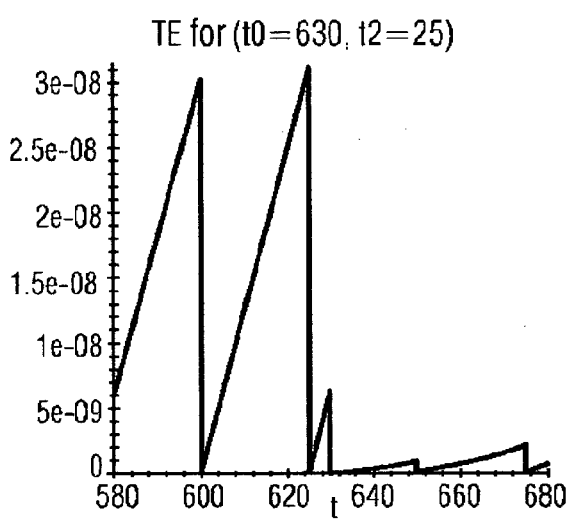
FIG. 27 is a graph of TE over t for t0=630 and t2=25.
Figure 28:
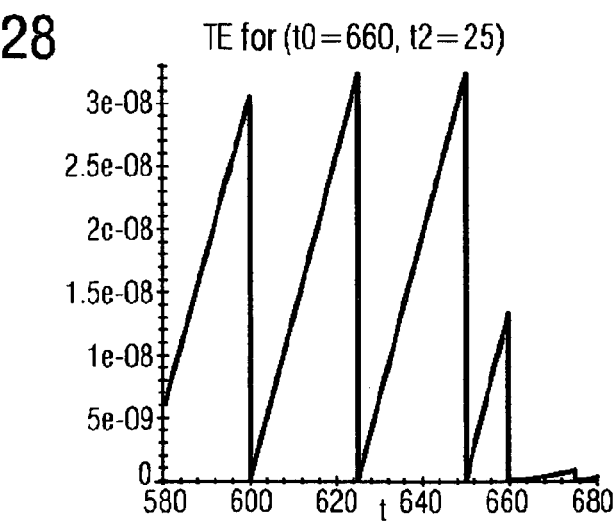
FIG. 28 is a graph of TE over t for t0=660 and t2=25.

FIGS. 26, 27 and 28 show TE with different values for t0, with in FIG. 26 t0=600, in FIG. 27 t0=630 and in FIG. 28 t0=660. The value for t2 in these cases is 25.

Figure 29:
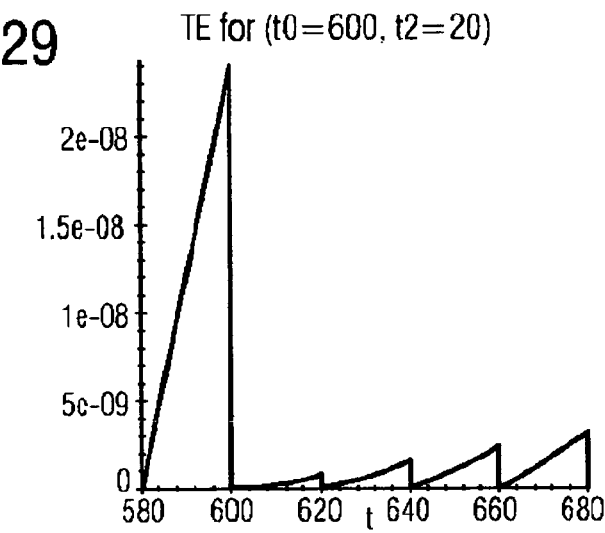
FIG. 29 is a graph of TE over t for t0=600 and t2=20.
Figure 30:
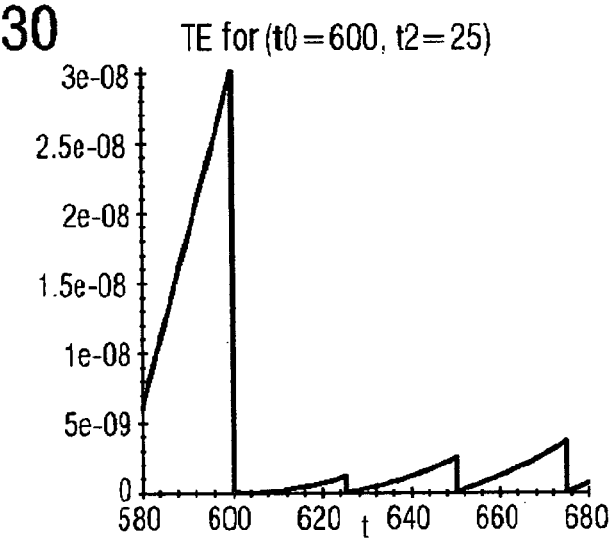
FIG. 30 is a graph of TE over t for t0=600 and t2=25.
Figure 31:
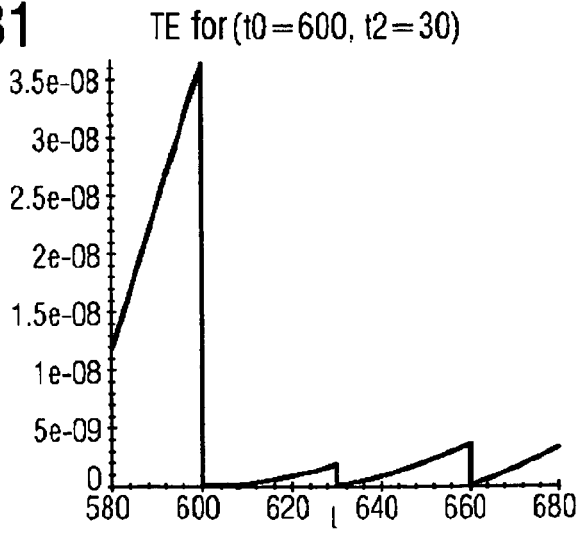
FIG. 31 is a graph of TE over t for t0=600 and t2=30.

FIGS. 29, 30 and 31 show TE with different values for t2, with in FIG. 29 t2=20, in FIG. 30 t2=25 and in FIG. 31 t2=30. The value for t0 in these cases is 600.

Computing the function values, Test 1:
lamda0:=0.1 $10^{-5}$
lamda1:0.1 $10^{-5}$
lamda2:=0.1 $10^{-5}$
L:=590
t0:=600, t1:=600, t2:=25
TopEreignis(590):=0.1768944364 $10^{-7}$
t:=630, t1:=630, t2:=25
TopEreignis(590):=0.1768944364 $10^{-7}$
Factor 1.0
t0:=660, t1:=660, t2:=25,
TopEreignis(590):=0.1768944364 $10^{-7}$
Factor 1.0
t0:=630, t1:=630, t2:=20
TopEreignis(590):=0.1179304105 $10^{-7}$
t0:=630, t1:=630, t2:=25
TopEreignis(590):=0.1768944364 $10^{-7}$
Factor 1.5
t0:=630, t1:=630, t2:=30
TopEreignis(590):=0.2358584624 $10^{-7}$
Factor 1.33

Computing the function values, Test 2:
lamda0:=0.1 $10^{-5}$
lamda1:=0.1 $10^{-5}$
lamda2:=0.1 $10^{-5}$
t:=635
t0:=600, t1:=600, t2:=25
TopEreignis(635):=0.6999757504 $10^{-9}$
t0:=630, t1:=630, t2:=25
TopEreignis(635):=0.9999975000 $10^{-10}$
Factor 1.42
t0:=660, t1:=660, t2:=25,
TopEreignis(635):=0.1269193831 $10^{-7}$
Factor 126.9
t0:=630, t1:=630, t2:=20
TopEreignis(635):=0.1499986250 $10^{-9}$
t0:=630, t1:=630, t2:=25
TopEreignis(635):=0.9999975000 $10^{-10}$
Factor 0.666
t0:=630, t1:=630, t2:=30
TopEreignis(635):=0.4999987500 $10^{-10}$
Factor 0.5

The variation of t0 or t1 causes greater changes of the value of TopEreignis than those of t2 (in Test 2), corresponding e.g. to the minimum value of the derivative after t0 or t2 at the next smallest maintenance interval point.

The effects of the variation of the mission times on the maximum are now to be investigated. For this the maximum of the function TE (TopEreignis) shown in FIG. 32 is determined:
TE=(B1 or B2) and B3
for t0=t1 =600 and t2=25
in the interval t=[0, 1300];
the result evaluation produces:
t0=t1:=598 and t2=25:
TE(1195.99)=0.2504644023 $e^{-7}$
t0=t1:=599 and t2=25:
TE(1197.99)=0.2750175563 $e^{-7}$
Factor 1.09
t0=t1:=600 and t2=25:
TE(1199.99)=0.2996915332 $e^{-7}$
Factor 1.08
t0=t1:=601 and t2=25:
TE(1199.99)=0.2996915332 $e^{-7}$
Factor 1
t0=t2:=602 and t2=25:
TE(1199.99)=0.2996915332 $e^{-7}$
Factor 1
t0=t1:=600 and t2:=23:
TE(1195.99)=0.2738692631 $e^{-7}$
t0=t1:=600 and t2:=24:
TE(1199.99)=0.2876989309 $e^{-7}$
Factor 1.05
t0=t1:=600 and t2:=25:
TE(1199.99)=0.2996915332 $e^{-7}$
Factor 1.04
t0=t1:=600 and t2:=26:
TE(1195.99)=0.3096073453 $e^{-7}$
Factor 1.03
t0=t1:=600 and t2:=27:
TE(1187.99)=0.3172057111 $e^{-7}$
Factor 1.02
t0=t1:=600 and t2:=30:
TE(1199.99)=0.3596533453 $e^{-7}$
Factor 1.13 (max!)

Figure 34:
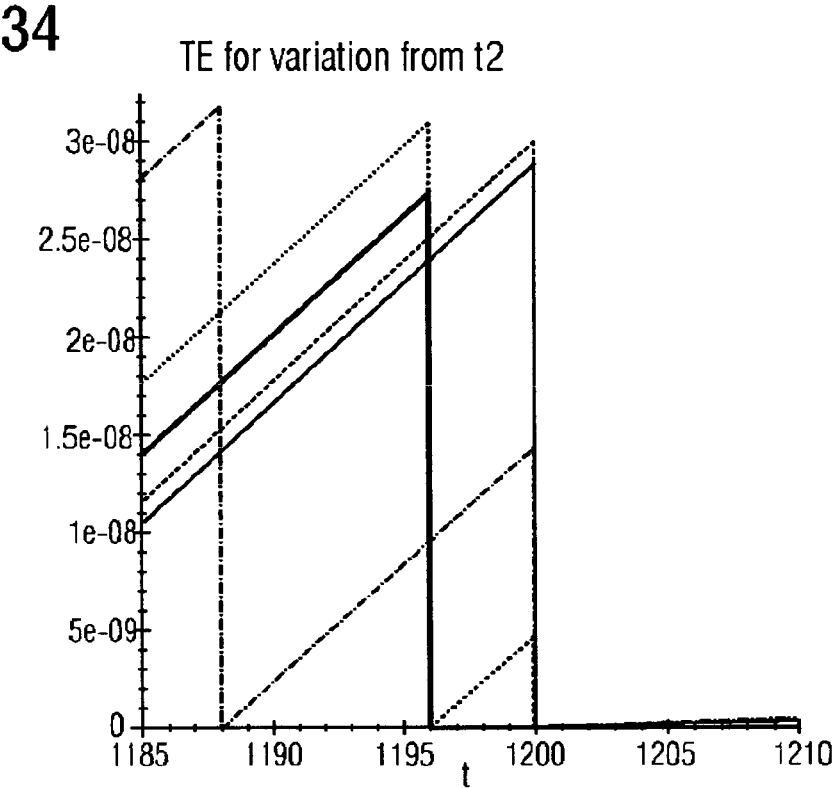
FIG. 34 is a graph of TE functions for different t2.
Figure 35:
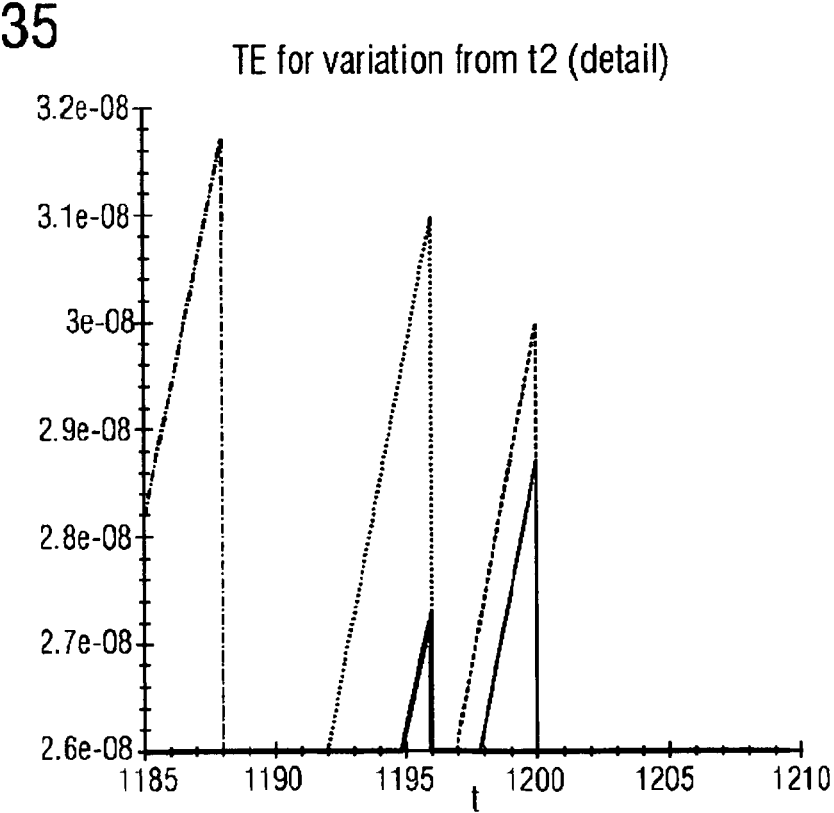
FIG. 35 is a graph of TE functions for different t2.

The effect of the variations is also shown in FIGS. 33 to 35, with FIG. 33 representing a variation of t0 and FIG. 34 a variation of t2, which can also be seen in more detail in FIG. 35.

Figure 36:
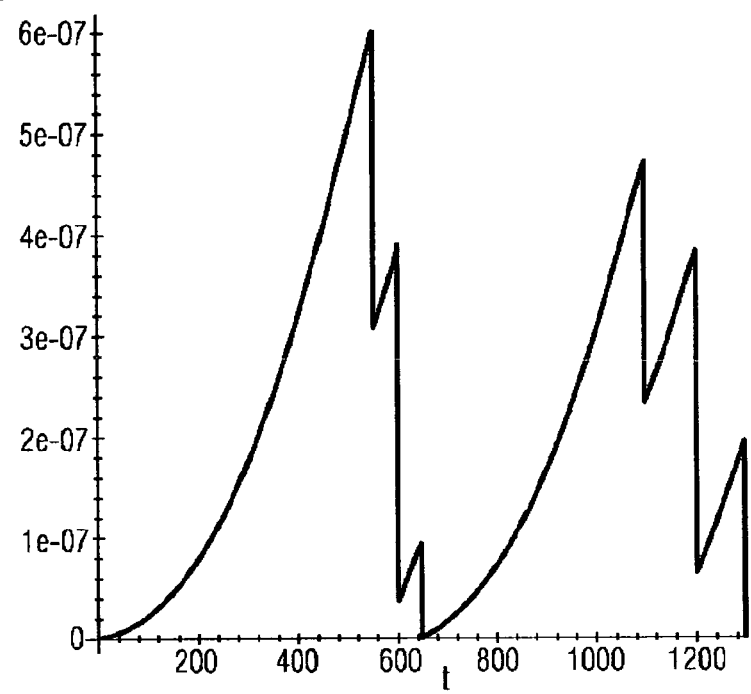
FIG. 36 is a graph of TE over t for t0=550, t1=600 and t2=650.

By contrast with the previous analysis of the mission time variation, three similar mission times are now taken and varied. For these the maximum of the function TE (TopEreignis) shown in FIG. 36 is determined:
TE=(B1 or B2) and B3
for t0=550, t1=600 and t2=650
in the interval t=[0, 1300].

Figure 37:
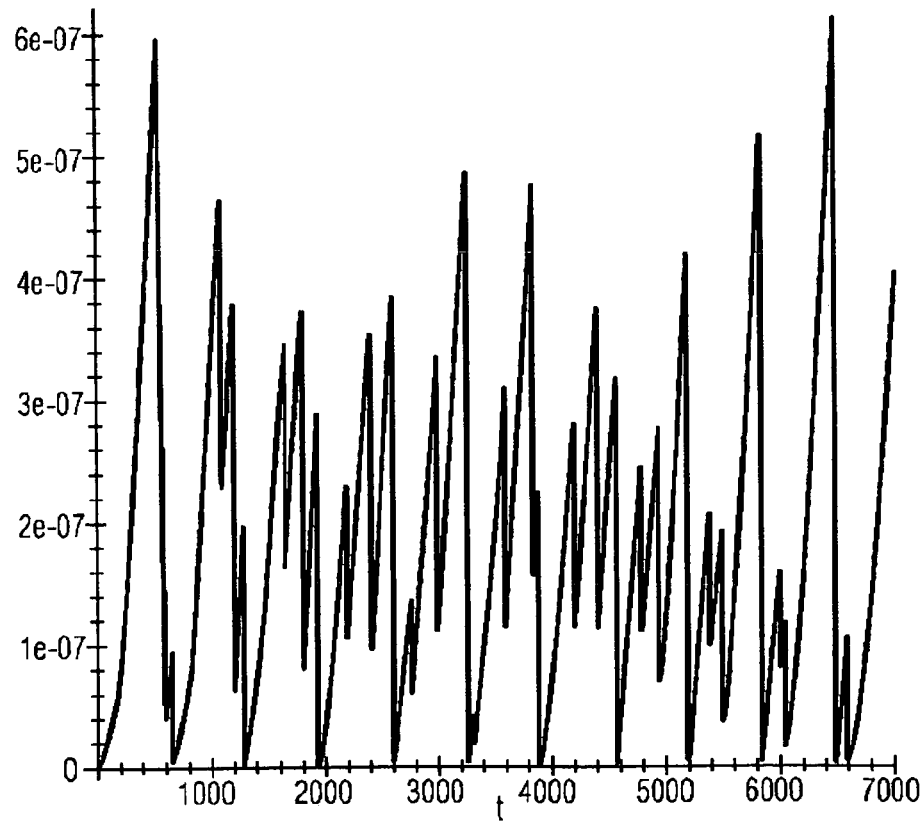
FIG. 37 is a graph of TE over t for t0=550, t1=600 and t2=650.

FIG. 37 further shows the function TE in the interval t=[0, 7000].

The result evaluation produces:
t0:=530, t1:=600, t2:=650,
TE(529.99)=0.5613326587 e–6
t0:=540, t1:=600, t2:=650,
TE(539.99)=0.5827060847 e–6
t0:=550, t1:=600, t2:=650,
TE(549.99)=0.6044792930 e–6
t0:=560, t1:=600, t2:=650,
TE(559.99)=0.6266508527 e–6
t0:=570, t1:=600, t2:=650,
TE(569.99)=0.6492221906 e–6 (max!)

Figure 38:
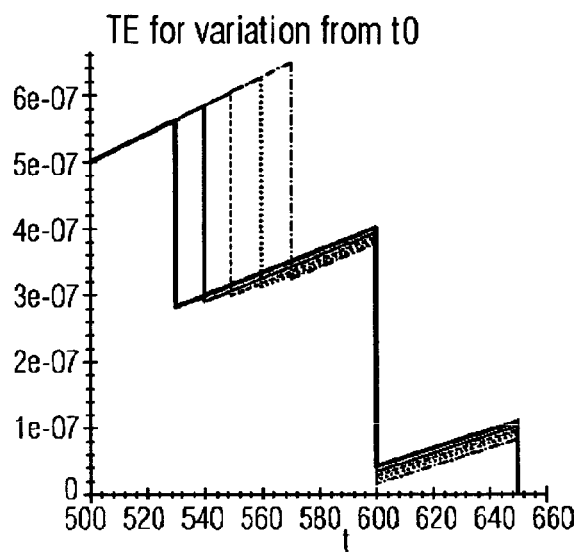
FIG. 38 is a graph of TE functions for different t0.
Figure 39:
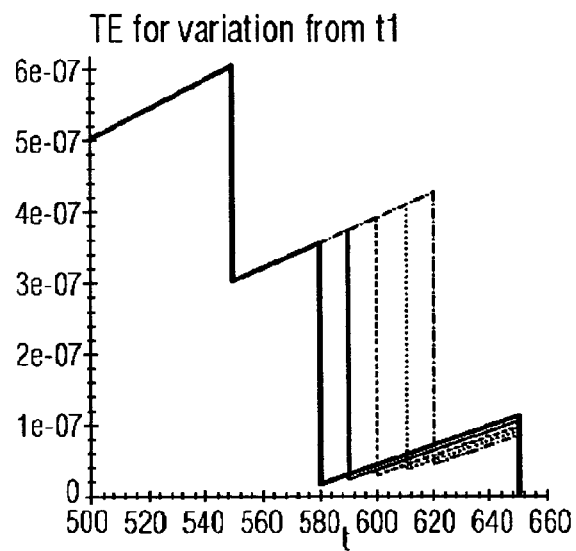
FIG. 39 is a graph of TE functions for different t1.
Figure 40:
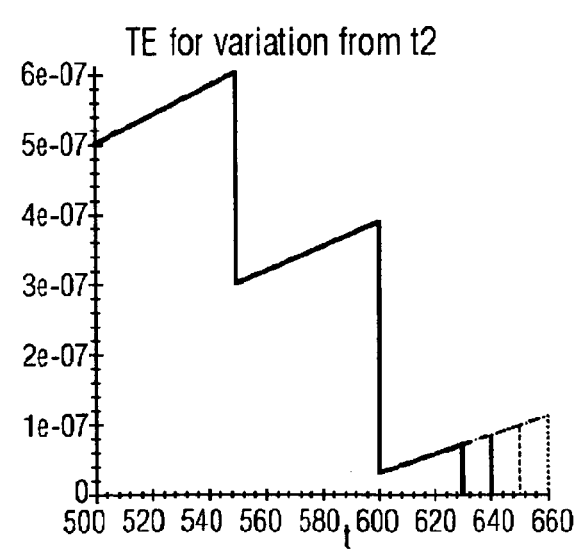
FIG. 40 is a graph of TE functions for different t2.

The effect of the variations is also shown in FIGS. 38 to 40, with FIG. 38 representing a variation of t0, FIG. 39 a variation of t1 and FIG. 40 a variation of t2. A variation of t1 or t2 brings no new maxima.

Furthermore a supplementary analysis is executed in the interval [3000, 4000]. The function TE (t0=550, t1=600 and t2=650) in this interval is shown in FIG. 41.

The following values are produced for the parameter combinations sought:
t0:=560, t1:=600, t2:=650,
TE(3899.99)=0.5455718742 e−6
t0:=570, t1:=600, t2:=650,
TE(3899.99)=0.5066169773 e−6
t0:=550, t1:=580, t2:=650,
TE(3249.99)=0.5520643381 e−6
t0:=550, t1:=590, t2:=650,
TE(3249.99)=0.5196021594 e−6
t0:=550, t1:=580, t2:=650,
TE(3899.99)=0.3053114410 e−6
t0:=550, t1:=590, t2:=650,
TE(3899.99)=0.2663418660 e−6
t0:=550, t1:=600, t2:=650,
TE(3899.99)=0.2273699519 e−6
t0:=550, t1:=600, t2:=660,
TE(3299.99)=0.5605551336 e−6 (max!)
t0:=550, t1:=600, t2:=670,
TE(3299.99)=0.5265920358 e−6

The effect of the variations is also shown in FIGS. 42 to 44, with FIG. 42 representing a variation of t0, FIG. 43 a variation of t1 and FIG. 44 a variation of t2. Furthermore FIGS. 45 to 47 show derivatives after t0, t1 or t2 for (t0=550, t1=600, t2=650).

As already described above, the function "TopEreignis" (TE) can be minimized depending on the time t and parameters "mission times". In such cases for zero point determination, especially of the function $MAX_{BCL \leq t \leq BCR}\{TE(t, MZ_1, MZ_2, MZ_3, MZ_4, \ldots)\} - TE^{Soll\ t=t} 0$ multi-dimensional, stable standard process, such as the multi-dimensional Newton process, gradient-based, can be used.

FIG. 48 shows a result of the optimization, with old function values "alt" and optimized function values "opt" with $TE^{opt}$: (t)<3e−7 being shown.

FIG. 48 here shows the old function values "alt" of the function TE(t)=(B1 or B2) and B3 or especially its maximum evaluated over the interval [3000, 6000] with the mission times $MZ_1:=550, MZ_2:=600, MZ_3:=650.$ Its maximum lies at the point $f(5849.99415)=0.5196108310e-6.$ An optimization leads to the changed mission times $MZ_1:=384.0855128$, $MZ_2:=398.0522588$, $MZ_3:=477.8097289$ with the shown changed function curve "opt" as well as the maximum $f^{22}(3822.47401)=0.2892541630\ 10\ e-6,$ and the abort criterion fulfilled herewith in accordance with the requirement $TE^{Soll}=0.3\ e-7$.

Naturally the features of the invention given in this document cannot only be used in the combination specified but also in other combinations or on their own, without departing from the framework of the invention.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of fault tree analysis, comprising:
   dividing representation of a system into subsystems of a system;
   assigning a time-dependent distribution function describing a probability of failure to each of the subsystems and constructing a fault tree based on said function; and
   evaluating, via a computer, a computed probability of failure of the system using the fault tree and deriving a maintenance strategy criteria for the system in accordance with said evaluating;
   determining a maximum of the probability of failure of the system;
   determining one of the mission times which has a greatest influence on the maximum of the probability of failure of the system; and
   varying the mission time determined, and
   wherein the time-dependent distribution function is dependent on mission times which form parameters of the system.

2. The method as claimed in claim 1, comprising:
   forming the distribution function by logically linking distribution functions of each of the subsystems and describing the probability of failure the system that is dependent on time.

3. A method of fault tree analysis, comprising:
   dividing representation of a system into subsystems of the system;
   assigning a time-dependent distribution function describing a probability of failure to each of the subsystems and constructing a fault tree based on said function; and
   evaluating, via a computer, a computed probability of failure of the system using the fault tree and deriving a maintenance strategy criteria for the system in accordance with said evaluating, and
   wherein a maximum of the probability of failure of the system is determined by an operation comprising:
   determining a constant;
   determining differences from multiples of all mission times within a predetermined time interval and a constant;
   determining function values of the distribution function for differences as arguments; and
   determining the maximum of the function values thus determined with a corresponding argument.

4. The method as claimed in claim 3, wherein a greatest influence mission time on the maximum of the probability of failure of the system is determined by an operation comprising:
   determining derivatives of the system distribution function after the mission times at the point at which the maximum of the probability of failure of the technical system lies; and
   determining the maximum value of these derivatives and the associated mission time.

5. The method as claimed in claim 4, wherein the mission time determined is varied by multiplying a value of the mission time by a factor which is less than 1.

6. The method as claimed in claim 3, wherein said determining of the maximum of the probability of failure of the system takes into account varying of the mission time, and wherein said method comprises:
 comparing the maximum of the probability of failure of the system with a predetermined probability of failure; and
 returning to said determining of the mission times when the maximum of the probability of failure of the system is greater than the predetermined probability of failure.

7. The method as claimed in claim 6, wherein said varying of the mission time is a minimization of the mission time.

8. The method as claimed in claim 7, wherein each maximum of the probability of failure of the system within a predetermined time interval is determined.

9. A method of fault tree analysis, comprising:
 dividing representation of a system into subsystems of a system;
 assigning a time-dependent distribution function describing a probability of failure to each of the subsystems;
 constructing, using a computer, a fault tree based on said function; and
 determining a maximum of the probability of failure of the system by an operation including:
  determining a constant;
  determining differences from multiples of all mission times within a predetermined time interval and a constant;
  determining function values of the distribution function for differences as arguments; and
  determining the maximum of the function values thus determined with a corresponding argument.

10. A method of fault tree analysis, comprising:
 dividing representation of a system into subsystems of the system;
 assigning a time-dependent distribution function describing a probability of failure to each of the subsystems and constructing a fault tree based on said function; and
 evaluating, via a computer, a computed probability of failure of the system using the fault tree and deriving a maintenance strategy criteria for the system in accordance with said evaluating; and
 wherein a maximum of the probability of failure of the system is determined by an operation including:
  determining a constant;
  determining differences from multiples of all mission times within a predetermined time interval and a constant;
  determining function values of the distribution function for differences as arguments; and
  determining the maximum of the function values thus determined with a corresponding argument,
 wherein a greatest influence mission time on the maximum of the probability of failure of the system is determined by an operation including:
  determining derivatives of the system distribution function after the mission times at the point at which the maximum of the probability of failure of the technical system lies; and
  determining the maximum value of these derivatives and the associated mission time; and
 wherein the mission time determined is varied by multiplying a value of the mission time by a factor which is less than 1.

* * * * *

UNITED STATES PATENT AND TRADEMARK OFFICE
CERTIFICATE OF CORRECTION

| | | |
|---|---|---|
| PATENT NO. | : 8,261,132 B2 | |
| APPLICATION NO. | : 12/226777 | |
| DATED | : September 4, 2012 | |
| INVENTOR(S) | : Wolfram Klein et al. | |

It is certified that error appears in the above-identified patent and that said Letters Patent is hereby corrected as shown below:

On the title page, item [56]; column 2 (Other Publication), line 2, delete "Alebriac" and insert --Algebraic--, therefor.

Column 12, line 36, in Claim 2, delete "failure the" and insert --failure of the--, therefor.

Signed and Sealed this
Twentieth Day of November, 2012

David J. Kappos
*Director of the United States Patent and Trademark Office*